United States Patent
Nakamura et al.

(10) Patent No.: US 9,560,167 B2
(45) Date of Patent: Jan. 31, 2017

(54) NETWORK SYSTEM, COMMUNICATION METHOD, SERVER, AND TERMINAL

(71) Applicant: SHARP KABUSHIKI KAISHA, Osaka-shi, Osaka (JP)

(72) Inventors: Masaya Nakamura, Osaka (JP); Yuhsuke Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 170 days.

(21) Appl. No.: 14/625,395

(22) Filed: Feb. 18, 2015

(65) Prior Publication Data
US 2015/0256650 A1  Sep. 10, 2015

(30) Foreign Application Priority Data

Mar. 6, 2014 (JP) ................................. 2014-043559

(51) Int. Cl.
*G06F 15/16* (2006.01)
*H04L 29/06* (2006.01)
*H04L 29/08* (2006.01)

(52) U.S. Cl.
CPC ............... *H04L 67/42* (2013.01); *H04L 29/06* (2013.01); *H04L 29/08072* (2013.01); *H04L 67/025* (2013.01); *H04L 67/10* (2013.01)

(58) Field of Classification Search
CPC .......................... H04L 29/06; H04L 29/08072
USPC ......... 709/206, 220, 224, 228, 232; 370/252
See application file for complete search history.

(56) References Cited

U.S. PATENT DOCUMENTS

| 6,633,649 | B1* | 10/2003 | Honnert | H04R 1/06 381/403 |
| 6,801,940 | B1* | 10/2004 | Moran | H04L 47/10 370/230 |
| 7,299,277 | B1* | 11/2007 | Moran | H04L 41/5022 370/230 |
| 8,185,651 | B2* | 5/2012 | Moran | H04L 47/10 709/224 |
| 8,621,025 | B2* | 12/2013 | Ridgard | H04L 67/1095 709/206 |
| 2010/0091676 | A1* | 4/2010 | Moran | H04L 47/10 370/252 |

FOREIGN PATENT DOCUMENTS

| JP | 2002-109097 A | 4/2002 |
| JP | 2002-152723 A | 5/2002 |
| JP | 2005-222225 A | 8/2005 |
| JP | 2006-211236 A | 8/2006 |
| JP | 2009-225481 | 10/2009 |
| JP | 2012-222080 A | 11/2012 |
| JP | 2013-162219 A | 8/2013 |

OTHER PUBLICATIONS

Japanese Office Action mailed Aug. 2, 2016 in JP application 2014-043559.

* cited by examiner

*Primary Examiner* — Khanh Dinh
(74) *Attorney, Agent, or Firm* — Nixon & Vanderhye P.C.

(57) ABSTRACT

A network system is provided that includes at least one terminal and a server. The server sends at least one terminal information for inhibiting sending of data from at least one terminal. At least one terminal each sends the server at least a part of obtained data according to the information from the server.

12 Claims, 23 Drawing Sheets

NETWORK SYSTEM, COMMUNICATION METHOD, SERVER, AND TERMINAL

This application priority to Japanese Patent Application No. 2014-043559, filed 6 Mar. 2014, the entire contents of which is hereby incorporated by reference.

BACKGROUND OF THE INVENTION

Field of the Invention

The present invention relates to a network system technology, specifically a network system used to control home appliances, and to a communication method, a server, and a terminal.

Description of the Related Art

Network systems used to control home appliances are known. For example, JP-A-2009-225481 discloses a communication device, a communication control method, and a communication control program. This publication discloses an adaptor that connects an electrical device to an ECHONET network. The adaptor includes a device object storing section that stores the object configuration information of a connecting electrical device in advance, an object configuration checking section that checks whether the object configuration information stored in the device object storing section matches the object configuration information obtained from a connected electrical device, and a network entry processing section that communicatably connects the electrical device and the ECHONET network to each other if the object configuration checking section determined that the object configuration information matches.

There has been proposed a communication protocol called ECHONET Lite. ECHONET Lite encompasses a control protocol and a protocol for a sensor network for smart houses, and has been internationally certified under ISO and IEC standards. For example, the Ministry of Economy, Trade and Industry in Japan certifies ECHONET Lite as a standard protocol for connecting a smart meter and an HEMS (Home Energy Management System).

However, sending of data from a home appliance to a server has the possibility of creating heavy traffic from the home appliance to the server, or overloading the server, when the data is sent directly to the server.

SUMMARY OF INVENTION

It is an object of the present invention to reduce the possibility of creating heavy traffic from a home appliance to a server, or the possibility of overloading a server.

According to some aspects of the present invention, there is provided a network system that includes at least one terminal and a server. The server sends the at least one terminal information for inhibiting sending of data from the at least one terminal. The at least one terminal each sends the server at least a part of obtained data according to the information from the server.

Preferably, the server sends first information for designating a time interval for sending data as the information, to the at least one terminal.

Preferably, the at least one terminal accumulates unsent data from the obtained data, creates data indicative of a difference in the plurality of accumulated data, and sends the data indicative of the difference to the server according to the first information.

Preferably, the at least one terminal sends the server only the most recent data in unsent data from the obtained data according to the first information.

Preferably, the server sends second information for designating a type of data to be sent as the information, to the at least one terminal.

Preferably, the server accepts a designation of a required data type from other terminal, and sends the second information to the at least one terminal according to the designated data type.

Preferably, the server sends the information to the at least one terminal when a predetermined condition is satisfied, and does not send the information to the at least one terminal when the predetermined condition is not satisfied.

Preferably, the server sends the information to the at least one terminal under the predetermined condition that a server load exceeds a predetermined value, and does not send the information to the at least one terminal under the predetermined condition that the server load does not exceed the predetermined value.

Preferably, the server sends the information to the at least one terminal under the predetermined condition that the terminal is a terminal of a non-paying member, and does not send the information to the at least one terminal under the predetermined condition that the terminal is a terminal of a paying member.

According to another aspect of the present invention, there is provided a communication method for a network system that includes at least one terminal and a server. The communication method includes: the server sending the at least one terminal information for inhibiting sending of data from the at least one terminal; and the at least one terminal each sending the server at least a part of obtained data according to the information from the server.

According to another aspect of the present invention, there is provided a server that includes:

a communication interface for communicating with at least one terminal; and a processor for sending the at least one terminal information for inhibiting sending of data from the at least one terminal, the information being sent via the communication interface.

According to another aspect of the present invention, there is provided a communication method for a server that includes a processor and a communication interface. The communication method includes: the processor sending the at least one terminal information for inhibiting sending of data from the at least one terminal, the information being sent via the communication interface; and the processor receiving data from the at least one terminal via the communication interface.

According to another aspect of the present invention, there is provided a communication program for a server that includes a processor and a communication interface. The communication program causes the processor to perform: sending at least one terminal information for inhibiting sending of data from the at least one terminal, the information being sent via the communication interface; and receiving data from the at least one terminal via the communication interface.

According to another aspect of the present invention, there is provided a terminal that includes:

a communication interface for communicating with a server; and a processor for receiving from the server information for inhibiting sending of data to the server, the information being received via the communication interface.

According to another aspect of the present invention, there is provided a communication method for a terminal that includes a processor and a communication interface.

The communication method includes: the processor receiving from a server information for inhibiting sending of data to the server, the information being received via the communication interface; and the processor sending data to the server via the communication interface according to the information.

According to another aspect of the present invention, there is provided a communication program for a server that includes a processor and a communication interface. The communication program causes the processor to perform: receiving from the server information for inhibiting sending of data to the server, the information being received via the communication interface; and sending data to the server via the communication interface according to the information.

The present invention is intended to reduce the possibility of creating heavy traffic from a home appliance to a server, or overloading a server, as above.

Additional features and advantages of the present disclosure will be set forth in the following detailed description. Alternatively, additional features and advantages will be readily apparent to those skilled in the art from the content of the detailed description or recognized by practicing the subject matter as described herein, including the detailed description, the claims, and the appended drawings. It is to be understood that the foregoing general description concerning the related art and the following detailed description are provided solely for illustrative purposes, and are intended to provide an overview or framework for understanding the nature and character of the invention as claimed.

DESCRIPTION OF THE PREFERRED EMBODIMENTS

Figure 1:
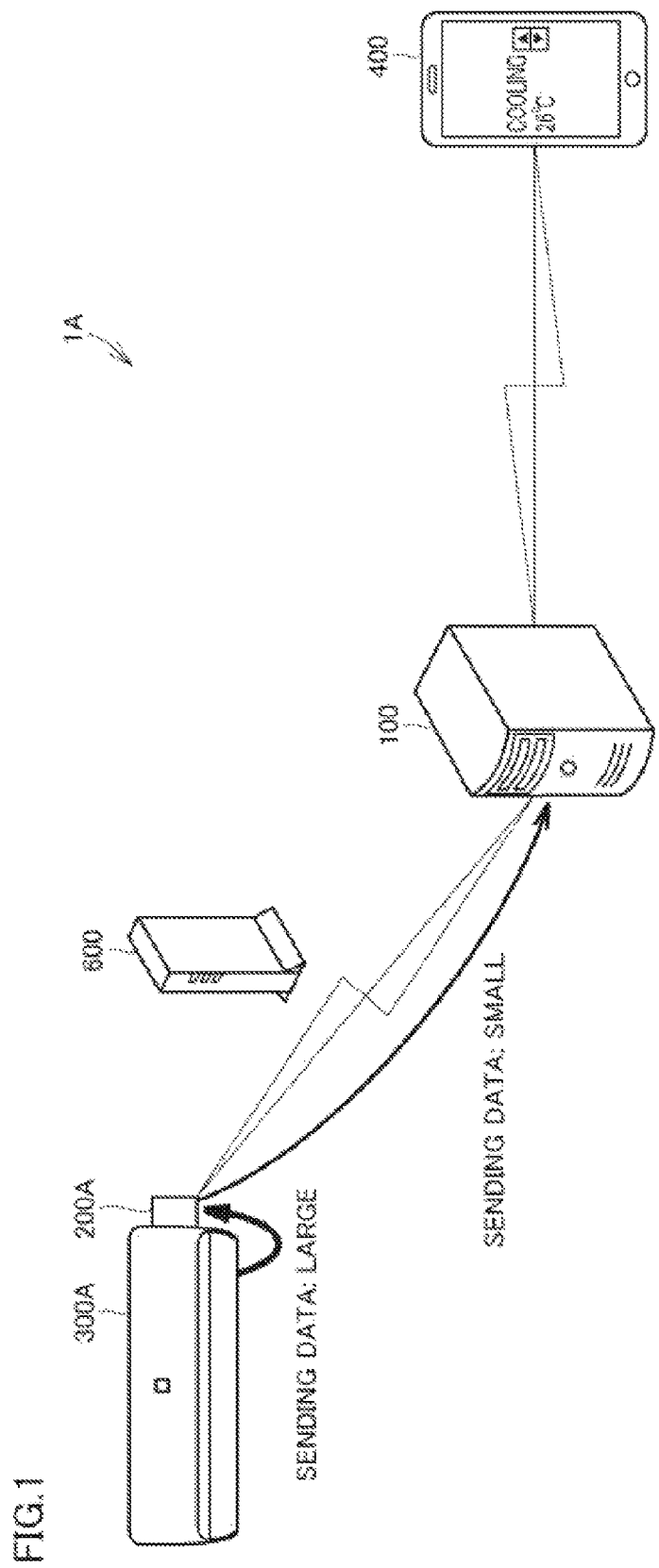
FIG. 1 is a schematic diagram representing the overall configuration of the network system 1A according to First Embodiment.

Embodiments of the present invention are described below with reference to the accompanying drawings. In the following descriptions, like elements are given like reference numerals. Such like elements will be referred to by the same names, and have the same functions. Accordingly, detailed descriptions of such elements will not be repeated.

First Embodiment

Overall Configuration of Network System 1A

The overall configuration of the network system 1A according to the present embodiment is described below. FIG. 1 is a schematic diagram representing the overall configuration of the network system 1A according to the present embodiment.

Referring to FIG. 1, the network system 1A according to the present embodiment includes an air conditioner 300A disposed as a home appliance in locations such as homes and offices, a controller 200A provided as a first terminal that enables data communications with the air conditioner 300A, a server 100 that enables data communications with the controller 200A, and a smartphone 400 provided as a second terminal that enables data communications with the server 100.

The following present embodiment will be described through the case where the home appliance is the air conditioner 300A. However, the home appliance may be, for example, a refrigerator as in Second Embodiment, or some other device such as a vacuum cleaner, a television, a washing machine, a rice cooker, an air purifier, a floor heating system, and an IH (Induction Heating) cooking heater. The air conditioner 300A can send and receive data to and from the controller 200A via a wired or a wireless connection.

The present embodiment will be described through the case where the first terminal is the controller 200A separately provided from the air conditioner 300A. The controller 200A can send and receive data to and from the air conditioner 300A via a wired or a wireless connection. The controller 200A also can send and receive data to and from the server 100 via a wired or a wireless connection.

The present embodiment will be described through the case where the second terminal is any of the smartphones 400 owned by users of the air conditioner 300A. The smartphone 400 enables controlling the air conditioner 300A from remote locations inside or outside of the room. The smartphone 400 can send and receive data to and from the server 100 via a wireless connection.

The server 100 can send and receive data to and from the controller 200A and the smartphone 400 over a network such as the Internet, and LAN (Local Area Network).

<Brief Overview of Network System Operation>

Figure 2:
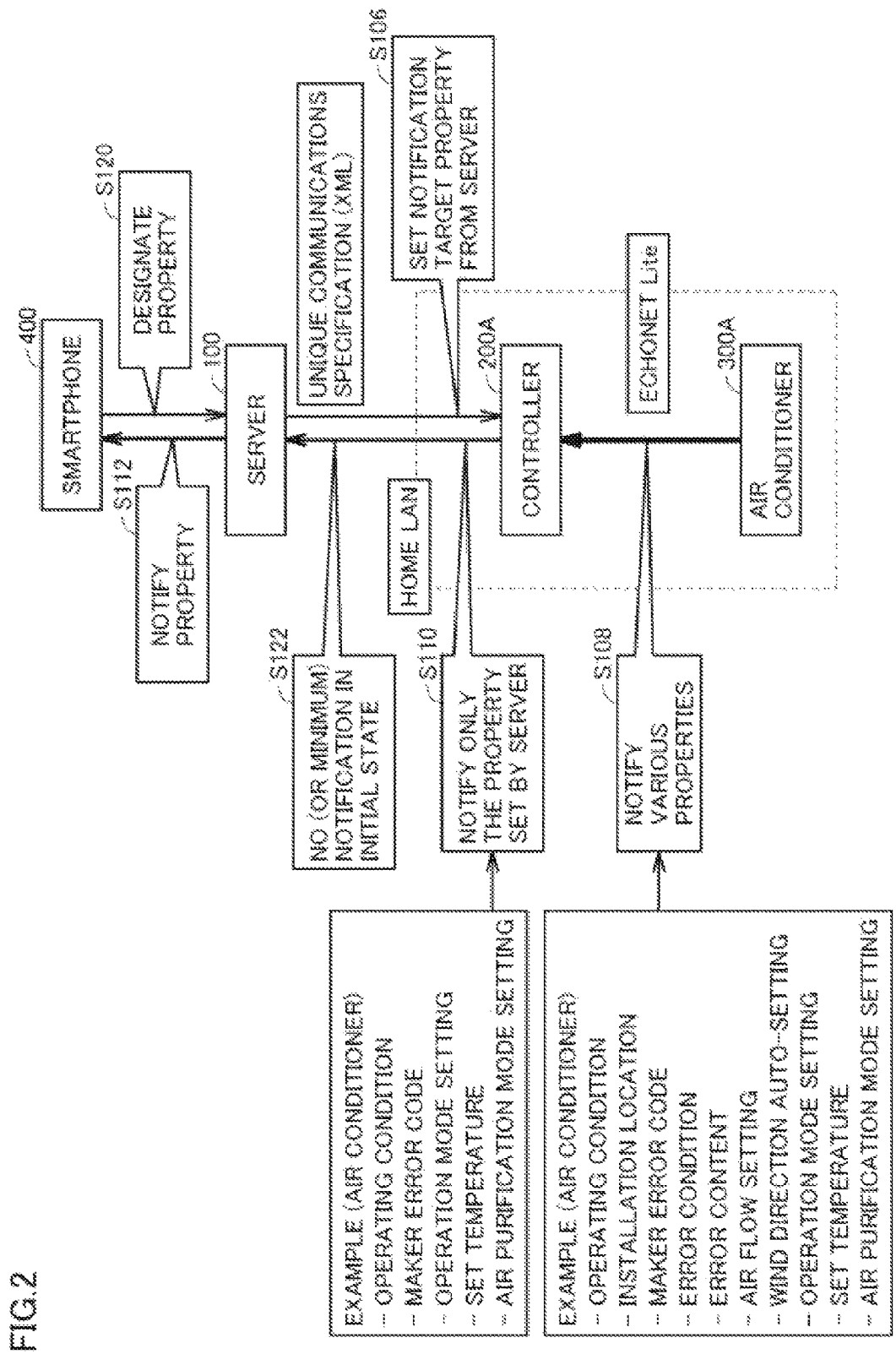
FIG. 2 is a schematic diagram briefly representing the overall operation of the network system 1A according to First Embodiment.

The following is a brief overview of the operation of the network system 1A according to the present embodiment. FIG. 2 is a schematic diagram briefly representing the operation of the network system 1A according to the present embodiment.

Referring to FIGS. 1 and 2, the server 100 sends the controller 200A an instruction for requesting a notification property concerning the air conditioner 300A (step S106). For example, the server 100 sends the controller 200A data for designating the property necessary for displaying on a remote control screen of the smartphone 400. The server 100 may send the controller 200A a designation of the necessary notification property according to an instruction from an air conditioner control application of the smartphone 400 (step S120).

The controller 200A receives from the server 100 the instruction for designating the notification property. Other main roles of the controller 200A include waiting for control instructions from the smartphone 400 and the server 100, and sending the data to the air conditioner 300A.

The air conditioner 300A sends various notification properties to the controller 200A either on a regular basis or upon accepting a control instruction from devices such as a switch and a remote controller (step S108). In the present embodiment, the communications between the air conditioner 300A and the controller 200A are based on the ECHONET Lite communications protocol.

From among the various notification properties received from the air conditioner 300A, the controller 200A sends the server 100 the notification property predesignated by the server 100 (step S110).

In the network system 1A according to the present embodiment, the controller 200A does not send a notification property to the server 100 in the initial state, specifically when the controller 200A or the air conditioner 300A has just been newly installed and the server 100 has not designated any notification property. Alternatively, in the initial state, the controller 200A sends the server 100 only information such as power ON/OFF information (step S122).

The server 100 receives the designated notification property from the controller 200A. By using the notification property, the server 100 sends the latest status information concerning the air conditioner 300A to the smartphone 400 associated with the sending controller 200A or air conditioner 300A (step S112).

Figure 3:
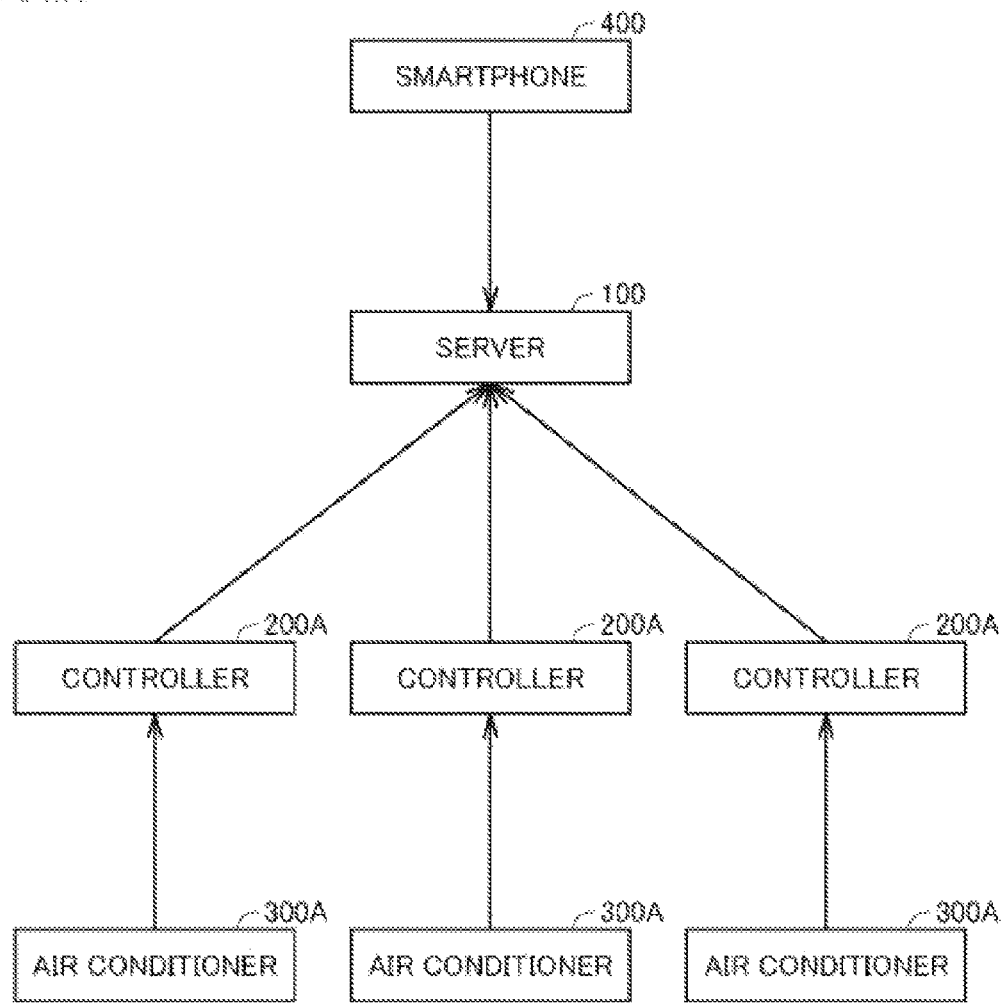
FIG. 3 is a block diagram representing the overall configuration of the network system 1A according to First Embodiment.

Specifically, in the present embodiment, for example, the server 100 receives a plurality of notification properties from a plurality of air conditioners 300A and controllers 200A disposed in different homes, as shown in FIG. 3. To be more specific, the server 100 receives large numbers of notification properties from air conditioners 300A disposed in different homes, offices, buildings, companies, and regions.

In network systems of related art, there is a high possibility of creating heavy traffic from the air conditioners 300A to the server 100, or overloading the server 100. In the present embodiment, however, not all notification properties sent from the air conditioner 300A to the controller 200A are sent to the server 100, and the possibility of creating heavy traffic from the air conditioners 300A to the server 100, or the possibility of overloading the server 100 can be reduced.

The following describes the specific configuration of the network system 1A for realizing such functions.

<Hardware Configuration of Server 100>

Figure 4:
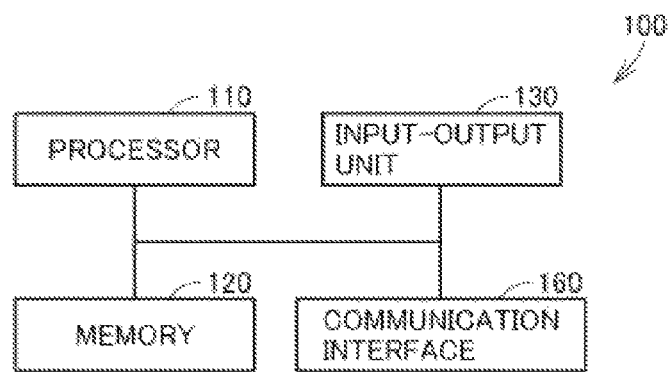
FIG. 4 is a block diagram representing the hardware configuration of the server 100 according to the present embodiment.

The following describes an aspect of the hardware configuration of the server 100. FIG. 4 is a block diagram representing the hardware configuration of the server 100 according to the present embodiment.

Referring to FIG. 4, the main constituting elements of the server 100 include a processor 110, a memory 120, an input/output unit 130, and a communication interface 160.

The processor 110 controls each part of the server 100 by running programs stored in the memory 120 or in external storage media. Specifically, the processor 110 runs the programs stored in the memory 120, and performs various programs, as will be described later.

The memory 120 is realized by various types of memory, including, for example, RAM (Random Access Memory), ROM (Read-Only Memory), and flash memory. The memory 120 may also be realized by, for example, storage media used with an interface, including, for example, USB (Universal Serial Bus®) memory, CD (Compact Disc), DVD (Digital Versatile Disk), memory card, hard disk, IC (Integrated Circuit) card, optical memory card, mask ROM, EPROM (Erasable Programmable Read Only Memory), and EEPROM (Electronically Erasable Programmable Read-Only Memory).

The memory 120 stores information such as programs run by the processor 110, data generated after the execution of a program by the processor 110, data for controlling the air conditioner 300A, data to be sent to the smartphone 400, input data via the input/output unit 130, data from the controller 200A, and data from the smartphone 400.

The input/output unit 130 accepts an instruction from an administrator, and enters the instruction in the processor 110. The input/output unit 130 outputs characters, images, and sounds by using signals from the processor 110.

The communication interface 160 is realized by various communications modules, including, for example, wireless LAN communications such as IEEE 802.11a/b/g/n/ac, Zig-Bee®, and BlueTooth® and wired LAN such as Ethernet®. The communication interface 160 is provided for data exchange with other devices over wired communications or wireless communications. The processor 110 receives programs, control instructions, image data, text data, sound data, and other such information from the controller 200A and the smartphone 400, and sends information such as image data, text data, and sound data to these and other devices via the communication interface 160.

The processor 110 via the communication interface 160 may constantly connect to the controller 200A by using a communication protocol such as WebSocket.

For example, the processor 110 accepts a designation of the notification property necessary for the control of the air conditioner 300A from either an administrator via the input/output unit 130 or the smartphone 400 via the communication interface 160. The processor 110 sends information necessary to designate the notification property to the controller 200A via the communication interface 160. The processor 110 receives the designated notification property from the controller 200A via the communication interface 160. By using the notification property from the controller 200A, the processor 110 creates data to be sent to the smartphone 400, and sends the data to the smartphone 400 via the communication interface 160.

<Hardware Configuration of Controller 200A>

Figure 5:
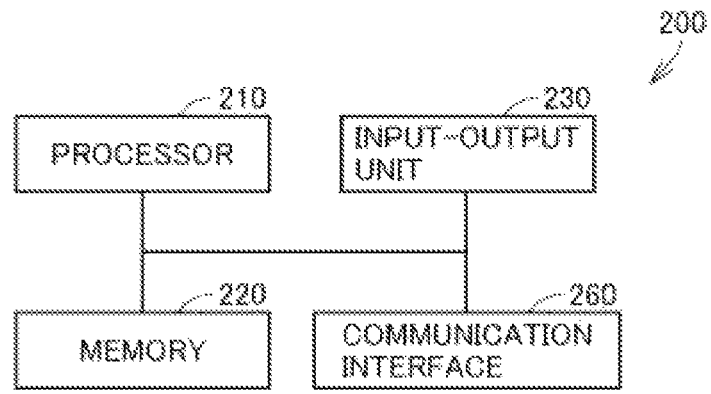
FIG. 5 is a block diagram representing the hardware configuration of the controller 200A according to the present embodiment.

The following describes an aspect of the hardware configuration of the controller 200A. FIG. 5 is a block diagram representing the hardware configuration of the controller 200A according to the present embodiment.

Referring to FIG. 5, the main constituting elements of the controller 200A include a processor 210, a memory 220, an input/output unit 230, and a communication interface 260.

The processor 210 controls each part of the controller 200A by running programs stored in the memory 220 or in external storage media. Specifically, the processor 210 runs the programs stored in the memory 220, and performs various programs, as will be described later with reference to FIGS. 6, 13, and 18.

The memory 220 is realized by various types of memory, including, for example, RAM, ROM, and flash memory. The memory 220 may also be realized by, for example, storage media used with an interface, including, for example, USB® memory, CD, DVD, memory card, hard disk, IC card, optical memory card, mask ROM, EPROM, and EEPROM.

The memory 220 stores information such as programs run by the processor 210, data generated after the execution of a program by the processor 210, and data 221 indicative of the designated notification property from the server 100.

The input/output unit 230 accepts an instruction from a user, and enters the instruction in the processor 210. The input/output unit 230 outputs characters, images, sounds, and LED light by using signals from the processor 210.

The communication interface 260 is realized by various communications modules, including, for example, wireless LAN communications such as IEEE 802.11a/b/g/n/ac, Zig-Bee®, and BlueTooth® and wired LAN such as Ethernet®. The communication interface 260 is provided for data exchange with other devices over wired communications or wireless communications. For example, the processor 210 receives programs, control instructions, image data, text data, sound data, and other such information from other devices such as the server 100 and the air conditioner 300A, and sends information such as image data, text data, and sound data to these and other devices via the communication interface 260.

The processor 210 via the communication interface 260 may constantly connect to the server 100 and the home appliances by using a communication protocol such as WebSocket.

<Communication Process by Controller 200A>

Figure 6:
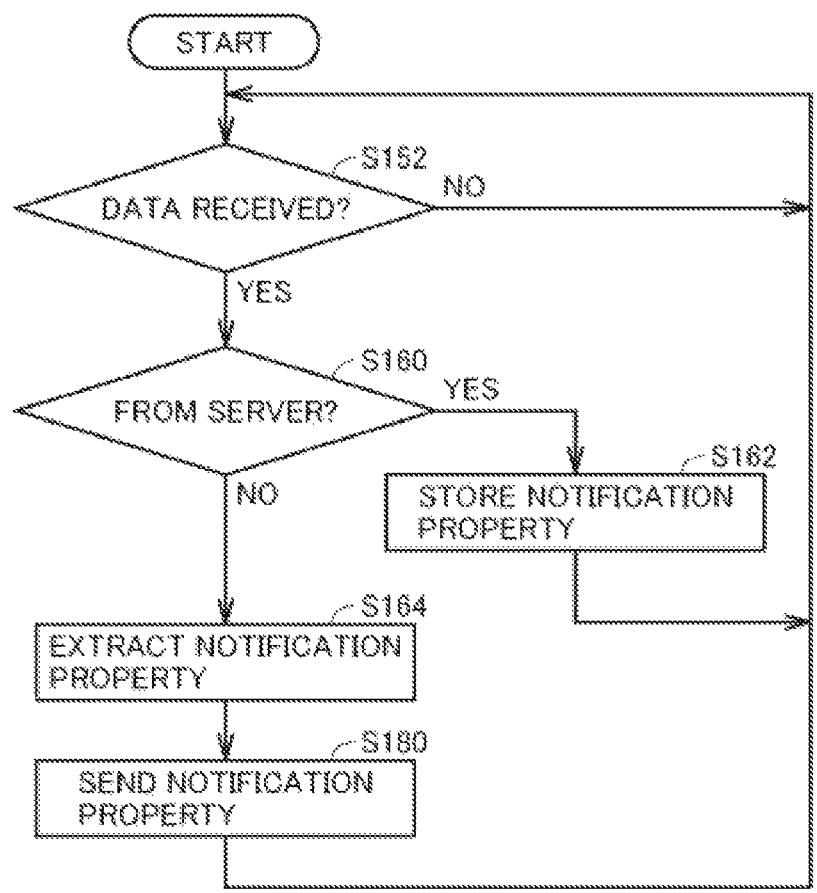
FIG. 6 is a flowchart representing the communication process by the controller 200A according to First Embodiment.

The following describes the communication process by the controller 200A according to the present embodiment. FIG. 6 is a flowchart representing the communication process by the controller 200A according to the present embodiment.

Referring to FIG. 6, the processor 210 determines whether data has been received from other devices via the communication interface 260 (step S152). When in receipt of data (YES in step S152), the processor 210 determines whether the data is from the server 100 (step S160).

When in receipt of data from the server 100 (YES in step S160), the processor 210 accepts a designation of a notification property contained in the data (step S162). The processor 210 stores the designated notification property in the memory 220. The processor 210 repeats the procedures from step S152.

When in receipt of data from the air conditioner 300A (NO in step S160), the processor 210 extracts the notification property designated by the server 100 from the plurality of notification properties sent from the air conditioner 300A (step S164). The processor 210 sends the extracted property to the server 100 via the communication interface 260 (step S180). The processor 210 repeats the procedures from step S152.

<Hardware Configuration of Air Conditioner 300A>

Figure 7:
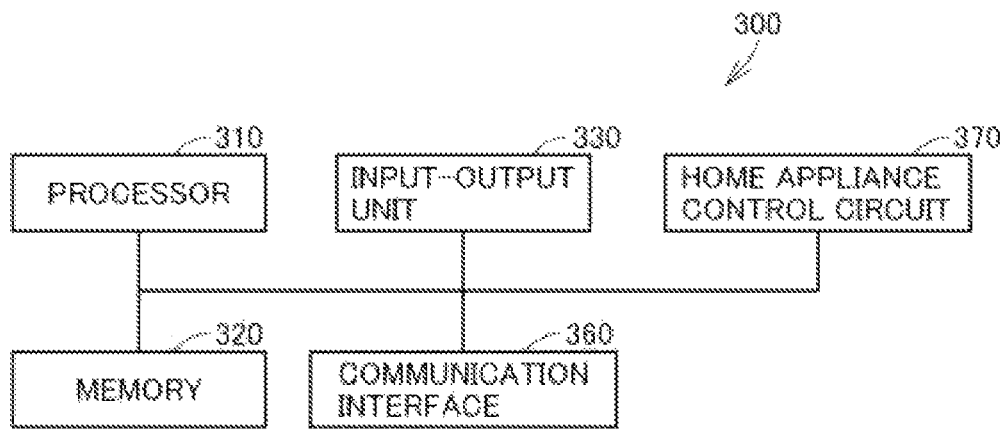
FIG. 7 a block diagram representing the hardware configuration of the air conditioner 300A according to the present embodiment.

The following describes an aspect of the hardware configuration of the air conditioner 300A. FIG. 7 is a block diagram representing the hardware configuration of the air conditioner 300A according to the present embodiment.

Referring to FIG. 7, the main constituting elements of the air conditioner 300A include a processor 310, a memory 320, an input/output unit 330, a communication interface 360, and a home appliance control unit 370.

The processor 310 controls each part of the air conditioner 300A by running programs stored in the memory 320 or in external storage media. Specifically, the processor 310 runs the programs stored in the memory 320, and performs various programs.

The input/output unit 330 accepts an instruction from a user, and enters the instruction in the processor 310. The input/output unit 330 outputs characters, images, sounds, and LED light by using signals from the processor 310.

The communication interface 360 is realized by various communications modules, including, for example, wireless LAN communications such as IEEE 802.11a/b/g/n/ac, Zig-Bee®, and BlueTooth® and wired LAN such as Ethernet®. The communication interface 360 is provided for data exchange with other devices over wired communications or wireless communications. The processor 310 receives programs, control instructions, image data, text data, sound data, and other such information from other devices such as the smartphone 400, and sends information such as image data, text data, and sound data to other devices such as the controller 200A via the communication interface 360. For example, the processor 310 sends the controller 200A information such as an instruction sent from a remote controller, and information detected by a sensor. The information is sent via the communication interface 360 by using the ECHONET Lite communication protocol.

The home appliance control unit 370 controls the motor, the actuator, and other parts of the air conditioner 300A as instructed by the processor 310.

<Hardware Configuration of Smartphone 400>

Figure 8:
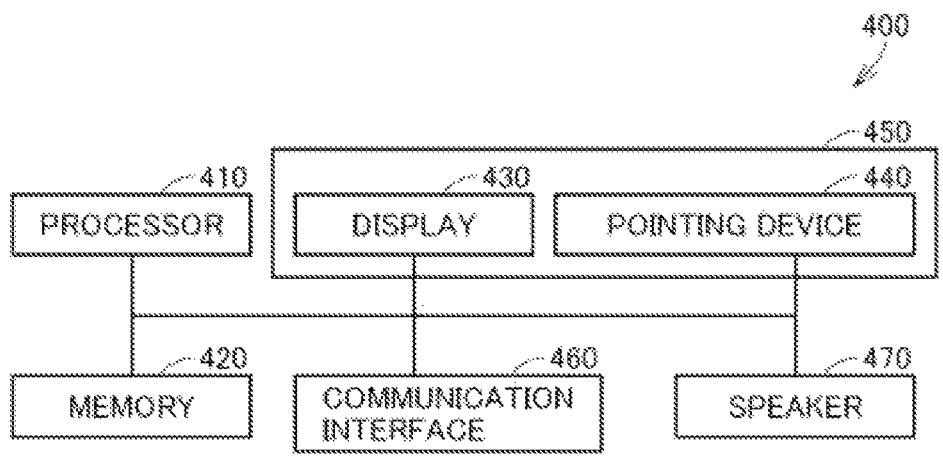
FIG. 8 a block diagram representing the hardware configuration of the smartphone 400 according to the present embodiment.

The following describes an aspect of the hardware configuration of the smartphone 400. FIG. 8 is a block diagram representing the hardware configuration of the smartphone 400 according to the present embodiment.

Referring to FIG. 8, the main constituting elements of the smartphone 400 include a processor 410, a memory 420, a touch panel 450 (a display 430 and a pointing device 440), a communication interface 460, and a speaker 470.

The processor 410 controls each part of the smartphone 400 by running programs stored in the memory 420 or in external storage media. Specifically, the processor 410 runs the programs stored in the memory 420, and performs various programs.

The memory 420 is realized by various types of memory, including, for example, RAM, ROM, and flash memory. The memory 420 may also be realized by, for example, storage media used with an interface, including, for example, USB® memory, CD, DVD, memory card, hard disk, IC card, optical memory card, mask ROM, EPROM, and EEPROM.

The memory 420 stores information such as programs run by the processor 410, data generated after the execution of a program by the processor 410, and data received from the server 100.

The display 430 outputs characters and images by using signals from the processor 410. The pointing device 440 accepts a user instruction, and inputs the instruction to the processor 410. In the present embodiment, the touch panel 450 used by the smartphone 400 is a combination of the display 430 and the pointing device 440.

The communication interface 460 is realized by various communications modules, including, for example, wireless LAN communications such as IEEE 802.11a/b/g/n/ac, ZigBee®, and BlueTooth® and wired LAN such as Ethernet®. The communication interface 460 is provided for data exchange with other devices over wired communications or wireless communications.

For example, the processor 410 operates as follows according to an air conditioner control application program. The processor 410 receives the predetermined notification property from the server 100 via the communication interface 460. By using the received notification property, the processor 410 makes the touch panel 450 display a screen for controlling the air conditioner 300A. The processor 410 accepts entry of a control instruction for the air conditioner 300A via the touch panel 450. The processor 410 sends the entered control instruction to the server 100 via the communication interface 460.

In the present embodiment, the processor 410 downloads an application program for remote controlling the air conditioner 300A, via the communication interface 460. The processor 410 may send a designation of a notification property to the server 100 via the communication interface 460 by using an air conditioner control application program. For example, the processor 410 sends the server 100 information for designating only the notification property necessary for the application program from among the notification properties specified by the rules concerning ECHONET Lite.

As described above, in the network system 1A according to the present embodiment, the controller 200A sends the server 100 only the notification property designated by the server 100, and can reduce the possibility of creating heavy traffic from the controller 200A to the server 100, or the possibility of overloading the server 100.

Second Embodiment

The following describes Second Embodiment. First Embodiment described the case where the home appliance is the air conditioner 300A. The present embodiment describes an example in which the home appliance is a refrigerator 300B.

<Overall Configuration of Network System>

Figure 9:
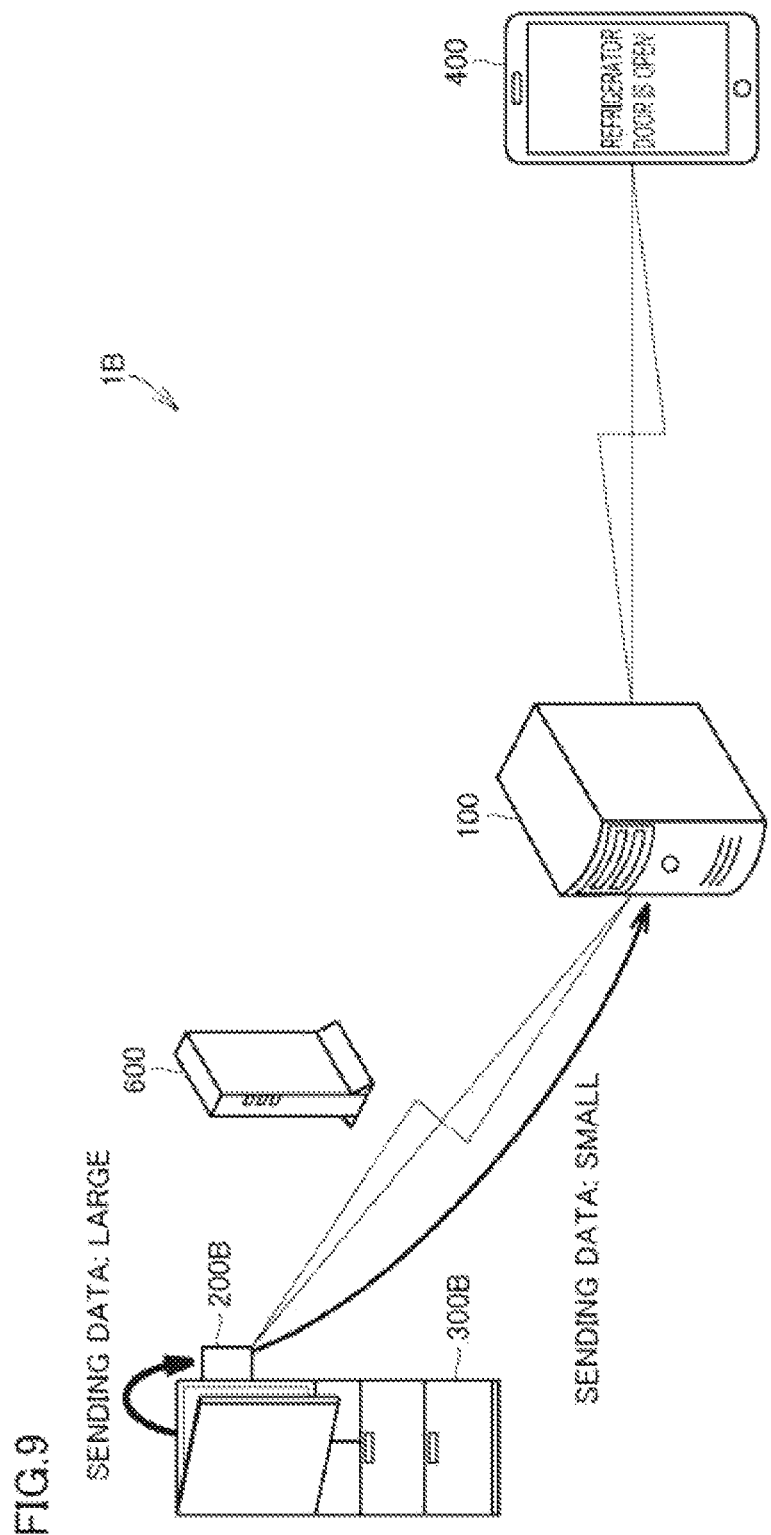
FIG. 9 is a schematic diagram representing the overall configuration of the network system 1B according to Second Embodiment.

The overall configuration of the network system 1B according to the present embodiment is described below. FIG. 9 is a schematic diagram representing the overall configuration of the network system 1B according to the present embodiment.

Referring to FIG. 9, the network system 1B according to the present embodiment includes the refrigerator 300B disposed as a home appliance in locations such as homes and offices, a controller 200B provided as a first terminal that enables data communications with the refrigerator 300B, a server 100 that enables data communications with the controller 200B, and a smartphone 400 provided as a second terminal that enables data communications with the server 100.

<Brief Overview of Network System Operation>

Figure 10:
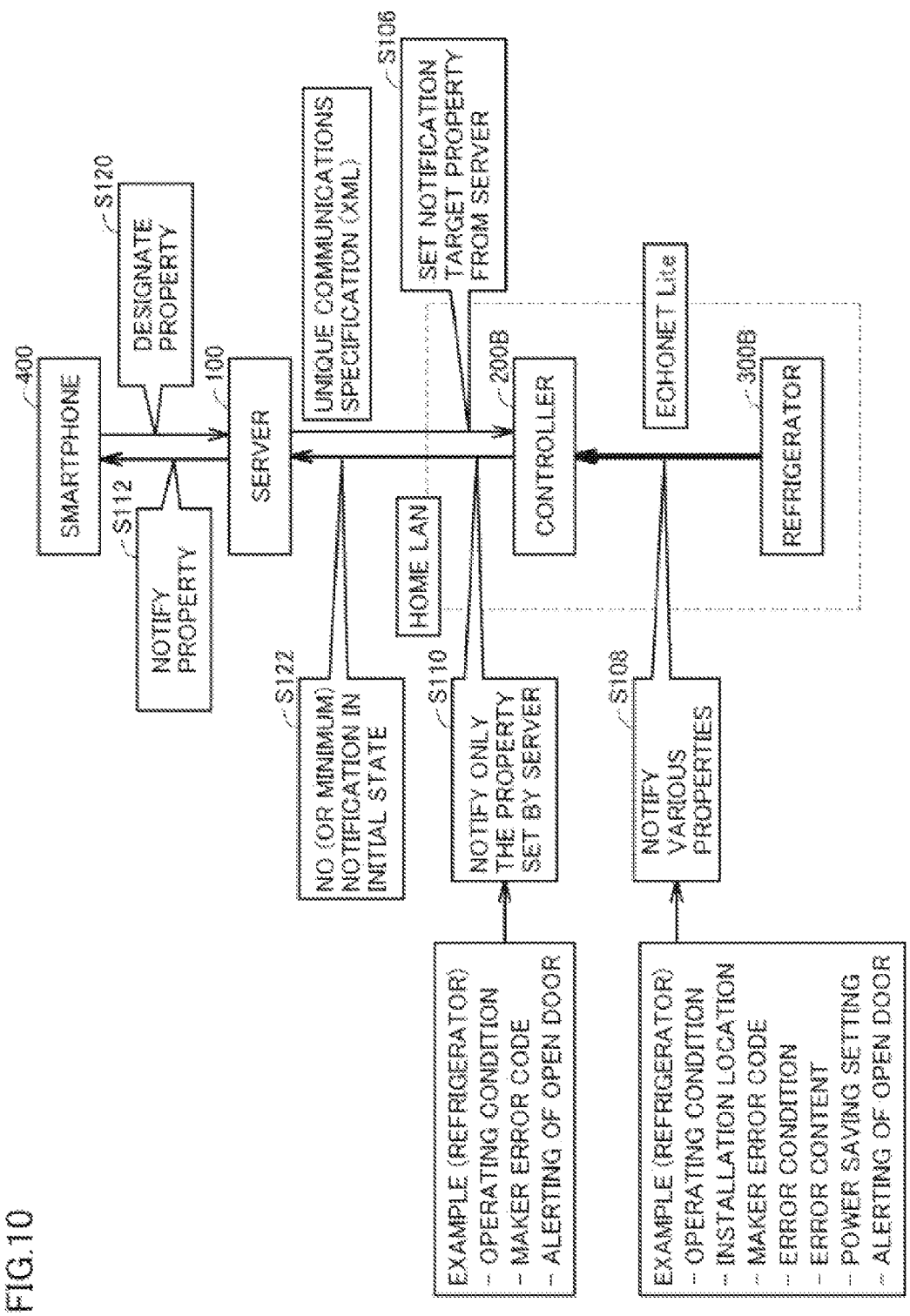
FIG. 10 is a schematic diagram briefly representing the overall operation of the network system 1B according to Second Embodiment.

The following is a brief overview of the operation of the network system 1B according to the present embodiment. FIG. 10 is a schematic diagram briefly representing the operation of the network system 1B according to the present embodiment.

Referring to FIG. 10, the server 100 sends the controller 200B a designation of a notification property concerning the refrigerator 300B (step S106). For example, the server 100 sends the controller 200B data for designating the property necessary for displaying on a remote control screen of the smartphone 400. The server 100 may send the necessary property to the controller 200B by using an instruction from a refrigerator control application from the smartphone 400 (step S120).

The controller 200B receives from the server 100 the instruction for designating the notification property. Other main roles of the controller 200B include receiving control instructions from the smartphone 400 and the server 100, and sending the data to the refrigerator 300B.

The refrigerator 300B sends various notification properties to the controller 200B either on a regular basis or upon accepting a control instruction from devices such as a switch and a remote controller (step S108). In the present embodiment, the communications between the refrigerator 300B and the controller 200B are based on the ECHONET Lite communications protocol.

From among the various notification properties received from the refrigerator 300B, the controller 200B sends the server 100 the notification property predesignated by the server 100 (step S110).

In the network system 1B according to the present embodiment, the controller 200B does not send a notification property to the server 100 in the initial state, specifically when the controller 200B or the refrigerator 300B has just been newly installed, and the server 100 has not designated any notification property. Alternatively, in the initial state, the controller 200B sends the server 100 only information such as power ON/OFF information (step S122).

The server 100 receives the designated notification property from the controller 200B. By using the notification property, the server 100 sends the latest status information concerning the refrigerator 300B to the smartphone 400 associated with the sending controller 200B or refrigerator 300B (step S112).

Specifically, in the present embodiment, the server 100 receives a plurality of notification properties from a plurality of refrigerators and controllers disposed in different homes, as shown in the network system of FIG. 3. To be more specific, the server 100 receives large numbers of notification properties from refrigerators disposed in different homes, offices, buildings, companies, and regions.

In network systems of related art, there is a high possibility of creating heavy traffic from the refrigerator 300B to the server 100, or overloading the server 100. In the present embodiment, however, not all notification properties sent from the refrigerator 300B to the controller 200B are sent to the server 100, and the possibility of creating heavy traffic from the refrigerator 300B to the server 100, or the possibility of overloading the server 100 can be reduced.

The specific configuration of the network system 1B is the same as that described in First Embodiment, and will not be described.

Third Embodiment

The following describes Third Embodiment. First and Second Embodiments described the case where the server 100 designates which type of notification property to send from the controller 200A or 200B. In the present embodiment, however, the server 100 designates the timing for sending a notification property to the controller 200A.

Figure 11:
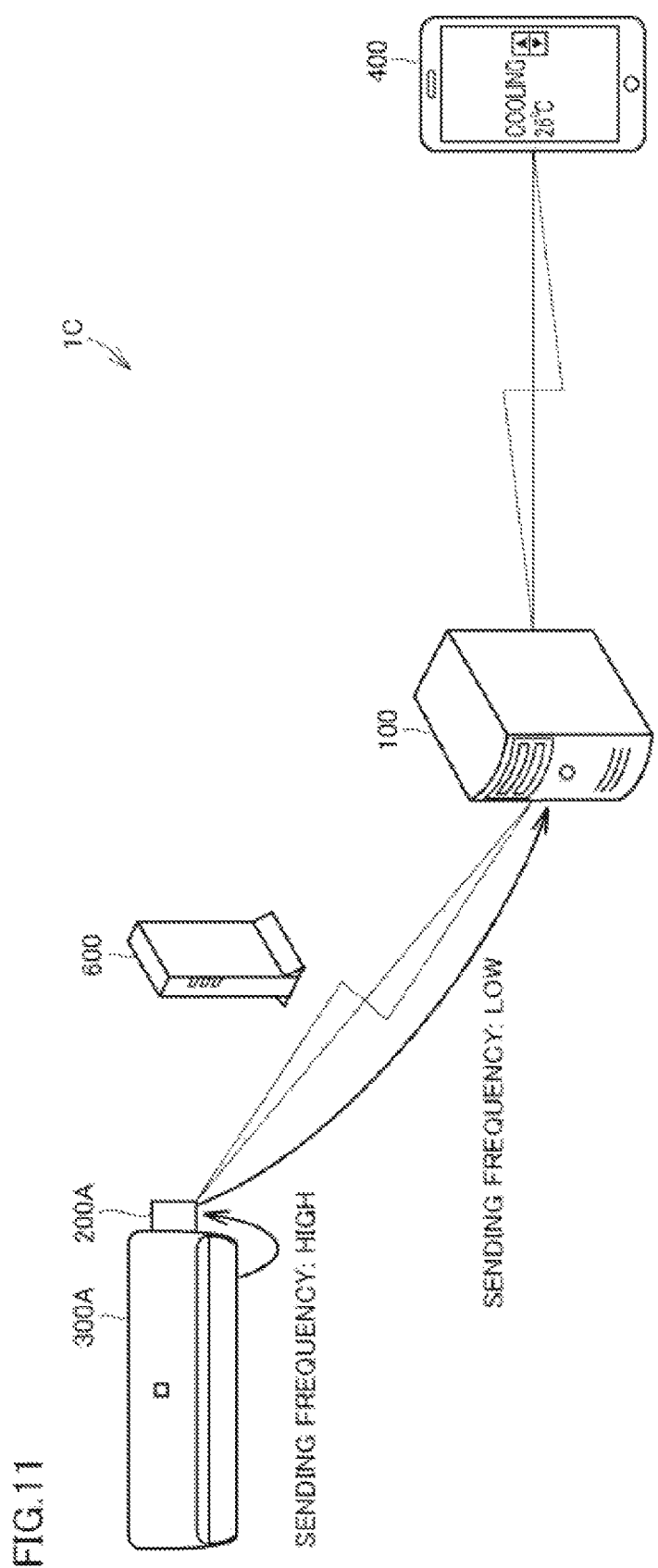
FIG. 11 is a schematic diagram representing the overall configuration of the network system 1C according to Third Embodiment.

The overall configuration of the network system 1C according to the present embodiment is described below. FIG. 11 is a schematic diagram representing the overall configuration of the network system 1C according to the present embodiment.

Referring to FIG. 11, the network system 1C according to the present embodiment includes an air conditioner 300A disposed as a home appliance in locations such as homes and offices, a controller 200A provided as a first terminal that enables data communications with the air conditioner 300A, a server 100 that enables data communications with the controller 200A, and a smartphone 400 provided as a second terminal that enables data communications with the server 100.

The following present embodiment will be described through the case where the home appliance is the air conditioner 300A. However, the home appliance may be, for example, a refrigerator as in Fourth Embodiment, or some other device such as a vacuum cleaner, a television, a washing machine, a rice cooker, an air purifier, a floor heating system, and an IH (Induction Heating) cooking heater. The air conditioner 300A can send and receive data to and from the controller 200A via a wired or a wireless connection.

The present embodiment will be described through the case where the first terminal is the controller 200A. The controller 200A can send and receive data to and from the air conditioner 300A via a wired or a wireless connection. The controller 200A also can send and receive data to and from the server 100 via a wired or a wireless connection.

The present embodiment will be described through the case where the second terminal is the smartphone 400. The smartphone 400 can send and receive data to and from the server 100 via a wireless connection.

The server 100 can send and receive data to and from the controller 200A and the smartphone 400 over a network such as the Internet, and LAN.

<Brief Overview of Network System Operation>

Figure 12:
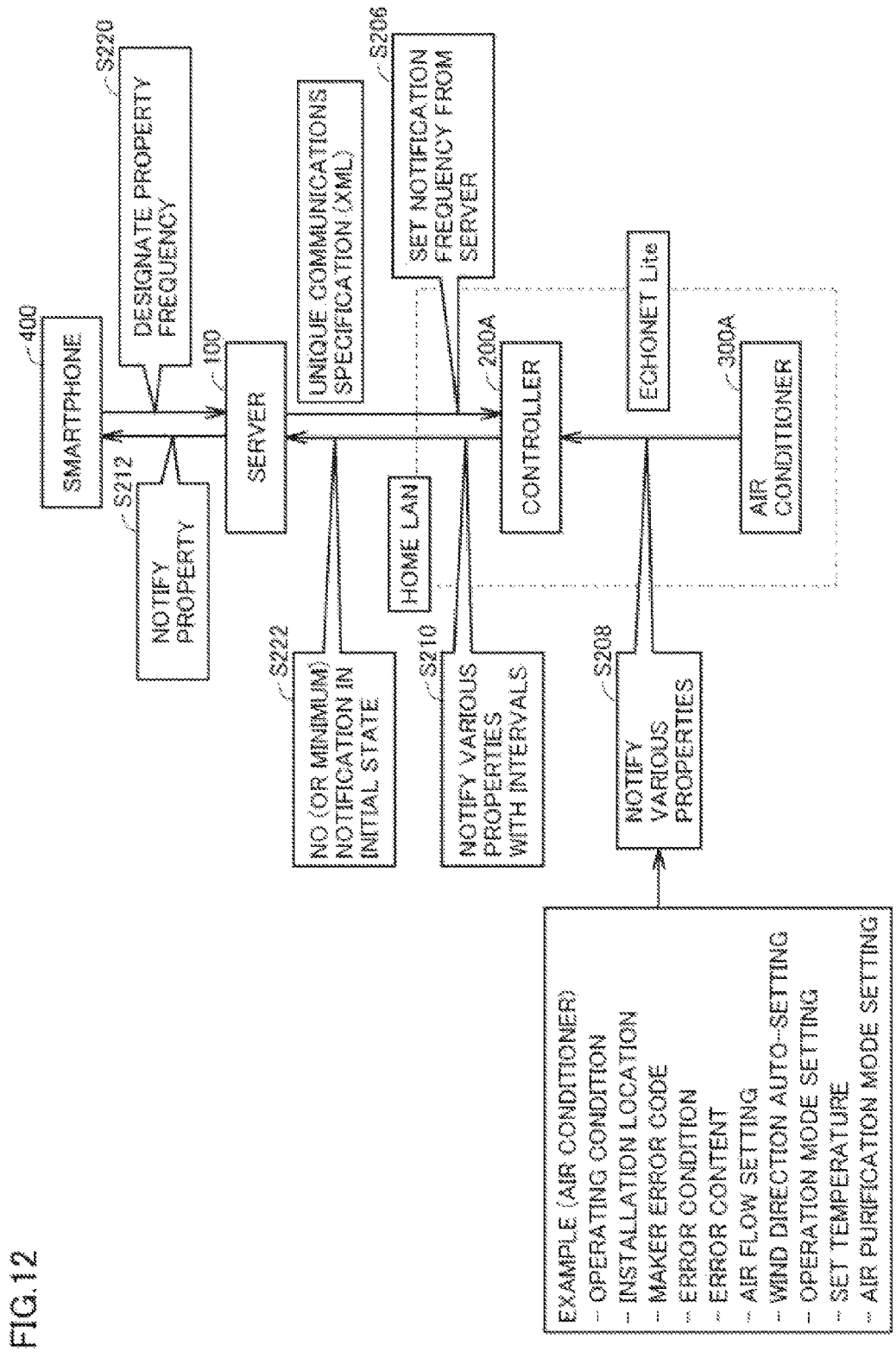
FIG. 12 is a schematic diagram briefly representing the overall operation of the network system 1C according to Third Embodiment.

The following is a brief overview of the operation of the network system 1C according to the present embodiment. FIG. 12 is a schematic diagram briefly representing the operation of the network system 1C according to the present embodiment.

Referring to FIG. 12, the server 100 sends the controller 200A data for designating the timing at which the controller 200A sends a notification property concerning the air conditioner 300A (step S206). For example, the server 100 sends the controller 200A a time interval for obtaining the property necessary for displaying on a remote control screen of the smartphone 400. Specifically, the server 100 instructs the controller 200A to wait several minutes to several ten minutes, instead of instructing the controller 200A to immediately forward data as is normally the case. The server 100 may send a designation of a send timing to the controller 200A by using an instruction from an air conditioner control application from the smartphone 400 (step S220).

The controller 200A receives the designation of the notification property send interval from the server 100. Other main roles of the controller 200A include receiving control instructions from the smartphone 400 and the server 100, and sending the data to the air conditioner 300A.

The air conditioner 300A sends various notification properties to the controller 200A either on a regular basis or upon accepting a control instruction from devices such as a switch and a remote controller (step S208). In the present embodiment, the communications between the air conditioner 300A and the controller 200A are based on the ECHONET Lite communications protocol.

Upon receiving various notification properties from the air conditioner 300A (step S208), the controller 200A sends the currently accumulated notification properties at the timing designated by the server 100 (step S210).

In the network system 1C according to the present embodiment, the controller 200A does not send a notification property to the server 100 in the initial state, specifically when the controller 200A or the air conditioner 300A has just been newly installed, and the server 100 has not designated any notification property. Alternatively, in the initial state, the controller 200A sends the server 100 only information such as power ON/OFF information (step S222).

The server 100 receives only the notification property from the controller 200A at the designated timing. The server 100 sends the latest status information concerning the air conditioner 300A to the smartphone 400 associated with the sending controller 200A or air conditioner 300A (step S212).

Specifically, in the present embodiment, for example, the server 100 receives a plurality of notification properties from a plurality of air conditioners 300A and controllers 200A disposed in different homes, as shown in FIG. 3. To be more specific, the server 100 receives large numbers of notification properties from air conditioners 300A disposed in different homes, offices, buildings, companies, and regions.

In network systems of related art, there is a high possibility of creating heavy traffic from the air conditioners 300A to the server 100, or overloading the server 100. In the present embodiment, however, the frequency of sending the notification property is reduced, or more than one notification property is sent to the server 100 at once. This makes it possible to reduce the possibility of creating heavy traffic from the air conditioners 300A to the server 100, or the possibility of overloading the server 100.

The following describes the specific configuration of the network system 1C for realizing such functions.

<Hardware Configuration of Server 100>

The hardware configuration of the server 100 is substantially the same as that described in First Embodiment (see FIG. 4), and the following describes only a specific example of the operation of the processor 110.

For example, the processor 110 accepts a designation of the send interval of a notification property of the air conditioner 300A from an administrator via the input/output unit 130, or from the smartphone 400 via the communication interface 160. For example, the processor 110 sends information indicative of the notification property send interval to the controller 200A via the communication interface 160. The processor 110 receives the notification property from the controller 200A via the communication interface 160. By using the notification property from the controller 200A, the processor 110 creates data to be sent to the smartphone 400, and sends the data to the smartphone 400 via the communication interface 160.

<Hardware Configuration of Controller 200A>

The hardware configuration of the controller 200A is substantially the same as that described in First Embodiment (see FIG. 5), and the following describes only a specific example of the operation of the processor 210.

<Communication Process by Controller 200A>

Figure 13:
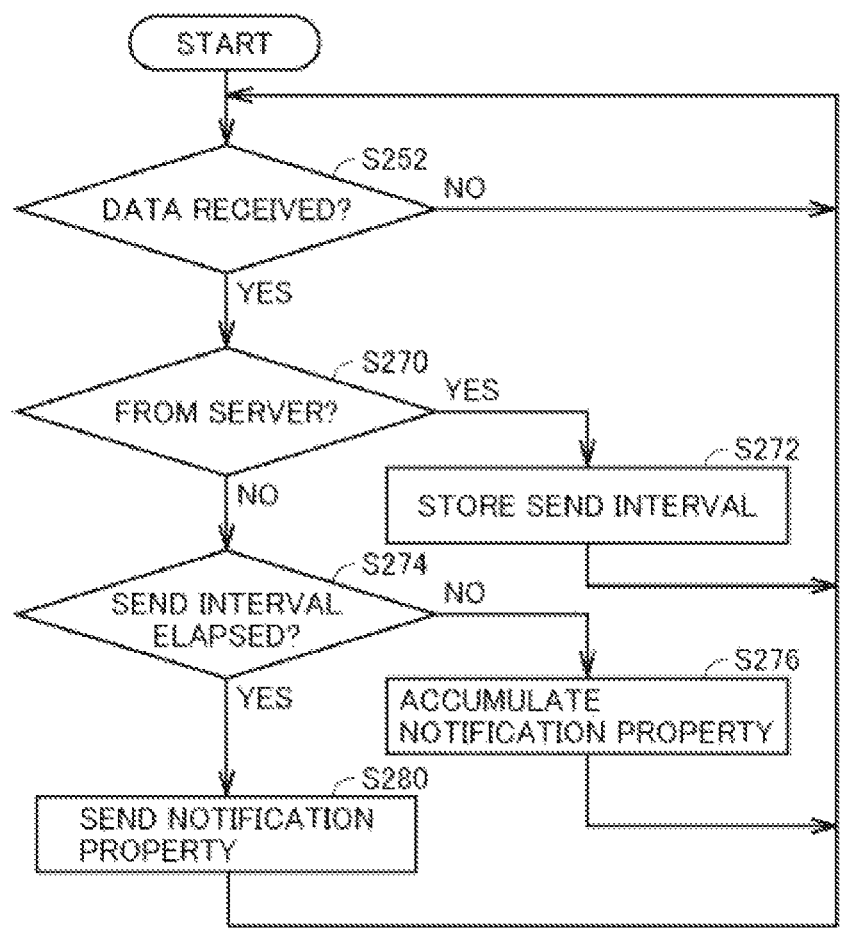
FIG. 13 is a flowchart representing the communication process by the controller 200A according to Third Embodiment.

The following describes the communication process by the controller 200A according to the present embodiment. FIG. 13 is a flowchart representing the communication process by the controller 200A according to the present embodiment.

Referring to FIG. 13, the processor 210 determines whether data has been received from other devices via the communication interface 260 (step S252). When in receipt of data (YES in step S252), the processor 210 determines whether the data is from the server 100 (step S270).

When in receipt of data from the server 100 (YES in step S270), the processor 210 accepts a designation of a notification property send interval contained in the data (step S272). Specifically, the processor 210 stores in the memory 220 the send interval designated by the server 100. The processor 210 repeats the procedures from step 252.

When in receipt of data from the air conditioner 300A (NO in step S270), the processor 210 refers to the timer value (not shown), and determines whether the designated send interval has elapsed from the last time a notification property was sent to the server 100 (step S274). If it is determined that the designated send interval has not elapsed since the last sending of a notification property to the server 100 (NO in step S274), the processor 210 accumulates the notification property from the air conditioner 300A in the memory 220 (step S276). The processor 210 repeats the procedures from step S252.

If it is determined that the designated send interval has elapsed from the last time a notification property was sent to the server 100 (YES in step S274), the processor 210 sends the accumulated notification properties to the server 100 via the communication interface 260 (step S280). The processor 210 repeats the procedures from step S252. Specifically, the processor 210 resets the timer.

<Hardware Configuration of Air Conditioner 300A>

The hardware configuration of the air conditioner 300A is substantially the same as that described in First Embodiment (see FIG. 7), and will not be described.

<Hardware Configuration of Smartphone 400>

The hardware configuration of the smartphone 400 is substantially the same as that described in First Embodiment (see FIG. 8), and will not be described.

As described above, in the network system 1C according to the present embodiment, the controller 200A sends the notification property to the server 100 at the send interval designated by the server 100. This makes it possible to reduce the possibility of creating heavy traffic from the controller 200A to the server 100, or the possibility of overloading the server 100.

Fourth Embodiment

The following describes Fourth Embodiment. Third Embodiment described the case where the home appliance is the air conditioner 300A. The present embodiment describes an example in which the home appliance is a refrigerator 300B.

<Overall Configuration of Network System>

Figure 14:
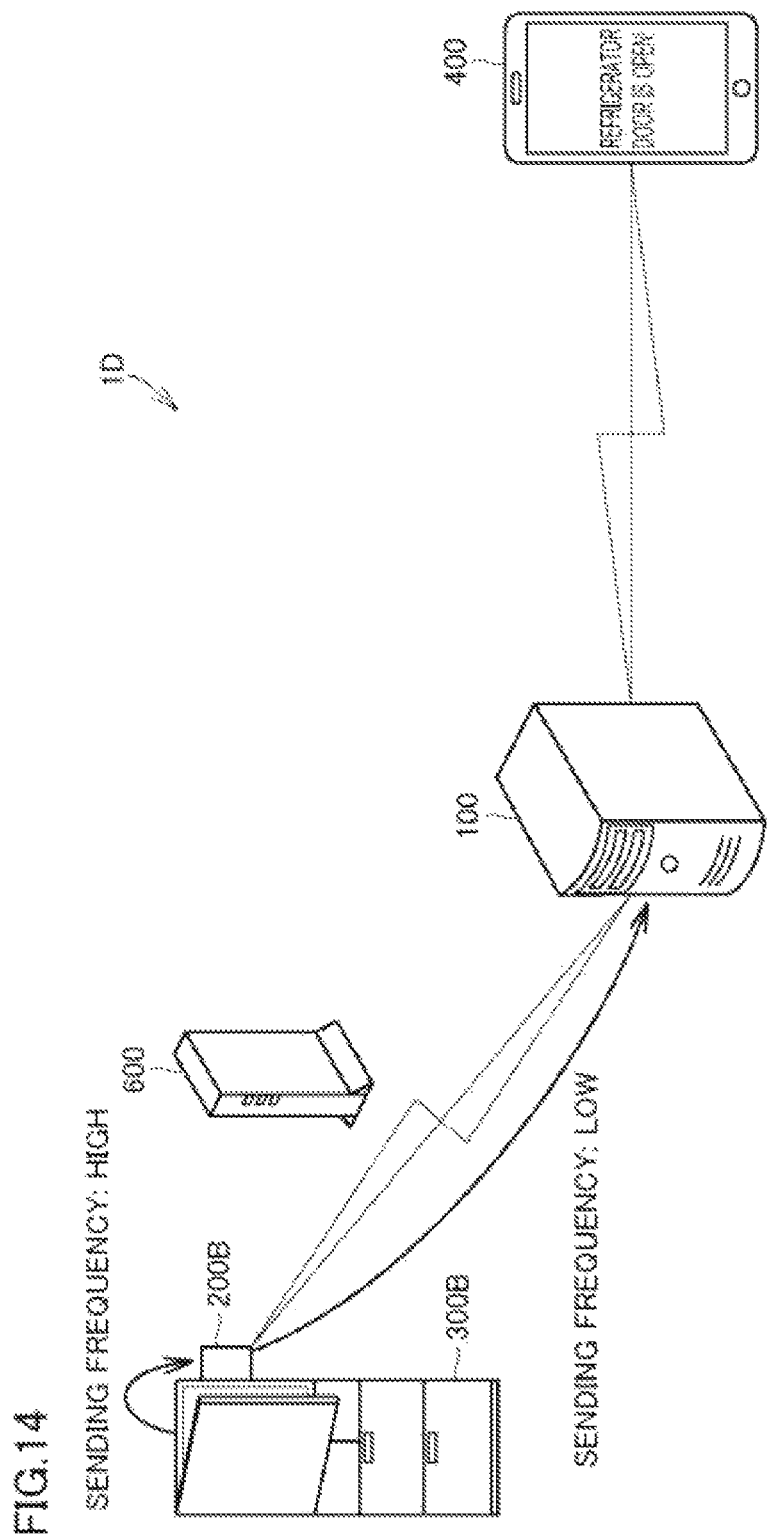
FIG. 14 is a schematic diagram representing the overall configuration of the network system 1D according to Fourth Embodiment.

The overall configuration of the network system 1D according to the present embodiment is described below. FIG. 14 is a schematic diagram representing the overall configuration of the network system 1D according to the present embodiment.

Referring to FIG. 14, the network system 1D according to the present embodiment includes the refrigerator 300B disposed as a home appliance in locations such as homes and offices, a controller 200B provided as a first terminal that enables data communications with the refrigerator 300B, a server 100 that enables data communications with the controller 200B, and a smartphone 400 provided as a second terminal that enables data communications with the server 100.

<Brief Overview of Network System Operation>

Figure 15:
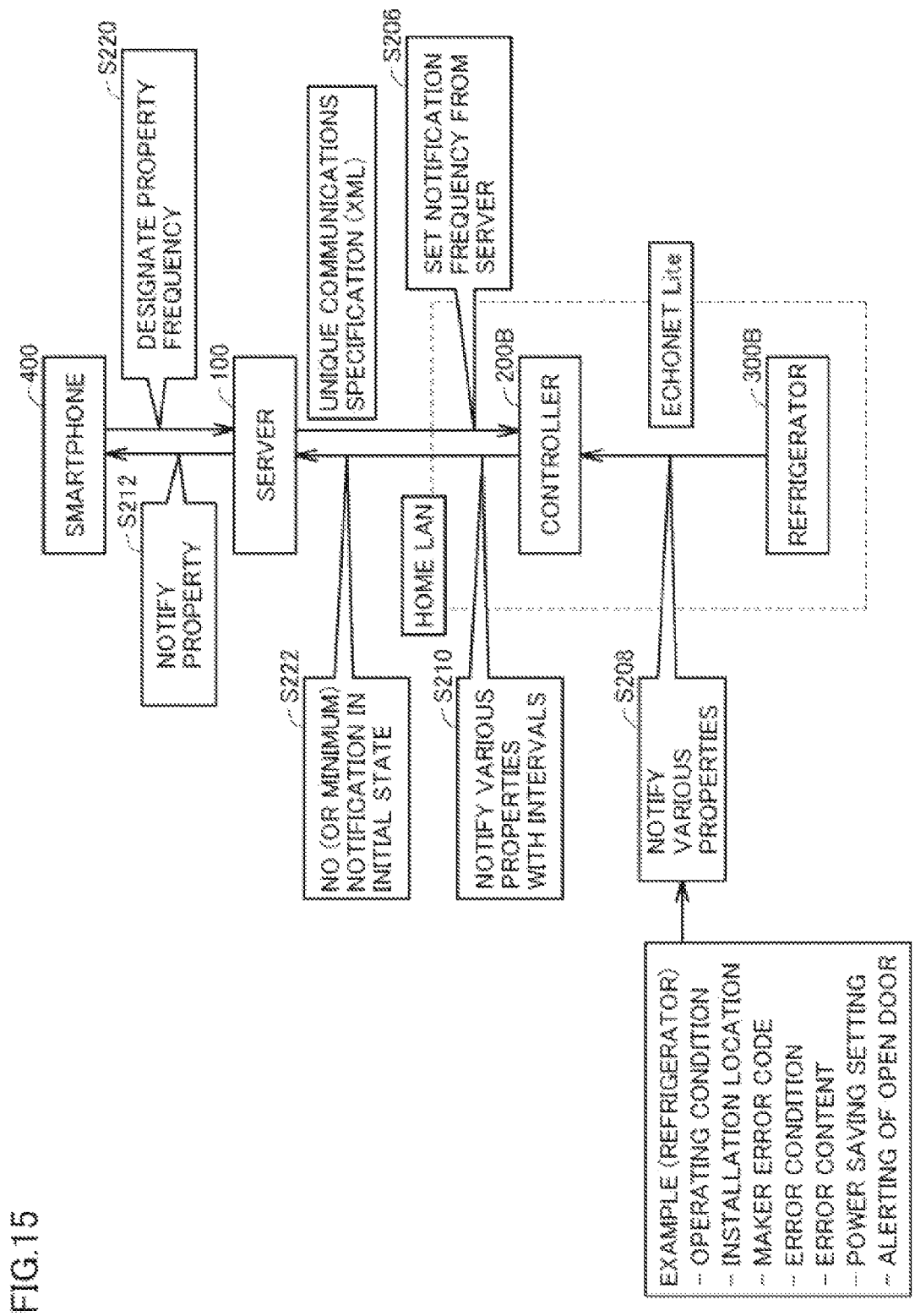
FIG. 15 is a schematic diagram briefly representing the overall operation of the network system 1D according to Fourth Embodiment.

The following is a brief overview of the operation of the network system 1D according to the present embodiment. FIG. 15 is a schematic diagram briefly representing the operation of the network system 1D according to the present embodiment.

Referring to FIG. 15, the server 100 sends the controller 200B data for designating the timing at which the controller 200B sends a notification property concerning the refrigerator 300B (step S206). For example, the server 100 sends the controller 200B a time interval for obtaining the property necessary for displaying on a remote control screen of the smartphone 400. Specifically, the server 100 instructs the controller 200B to wait several minutes to several ten minutes, instead of instructing the controller 200B to immediately forward data as is normally the case. The server 100 may send the send timing to the controller 200B by using an instruction from a refrigerator control application from the smartphone 400 (step S220).

The controller 200B receives the designation of the notification property send interval from the server 100. Other main roles of the controller 200B include receiving control instructions from the smartphone 400 and the server 100, and sending the data to the refrigerator 300B.

The refrigerator 300B sends various notification properties to the controller 200B at a designated timing (step S208). In the present embodiment, the communications between the refrigerator 300B and the controller 200B are based on the ECHONET Lite communications protocol.

Upon receiving various notification properties from the refrigerator 300B (step S208), the controller 200B sends only the currently stored notification properties at the timing designated by the server 100 (step S210).

In the network system 1D according to the present embodiment, the controller 200B does not send a notification property to the server 100 in the initial state, specifically when the controller 200B or the refrigerator 300B has just been newly installed, and the server 100 has not designated any notification property. Alternatively, in the initial state, the controller 200B sends the server 100 only information such as power ON/OFF information (step S222).

The server 100 receives the notification properties from the controller 200B at the designated timing. The server 100 sends the latest status information concerning the refrigerator 300B to the smartphone 400 associated with the sending controller 200B or refrigerator 300B based on the notification properties (step S212).

Specifically, in the present embodiment, for example, the server 100 receives a plurality of notification properties from a plurality of refrigerators and controllers disposed in different homes, as shown in FIG. 3. To be more specific, the server 100 receives large numbers of notification properties from refrigerators disposed in different homes, offices, buildings, companies, and regions.

In network systems of related art, there is a high possibility of creating heavy traffic from the refrigerator 300B to the server 100, or overloading the server 100. In the present embodiment, however, the frequency of sending the notification property is reduced, or more than one notification property is sent to the server 100 at once. This makes it possible to reduce the possibility of creating heavy traffic from the refrigerator 300B to the server 100, or the possibility of overloading the server 100.

The specific configuration of the network system 1D is the same as that described in Third Embodiment, and will not be described.

Fifth Embodiment

The following describes Fifth Embodiment. In First and Second Embodiments, the server 100 designates which notification property to send from the controller 200A or 200B. In Third and Fourth Embodiments, the server designates a send timing for the notification property to be sent from the controller 200A. In the present embodiment, however, the server 100 designates the type of notification property to be sent from the controller 200A, and a timing for sending the notification property.

Figure 16:
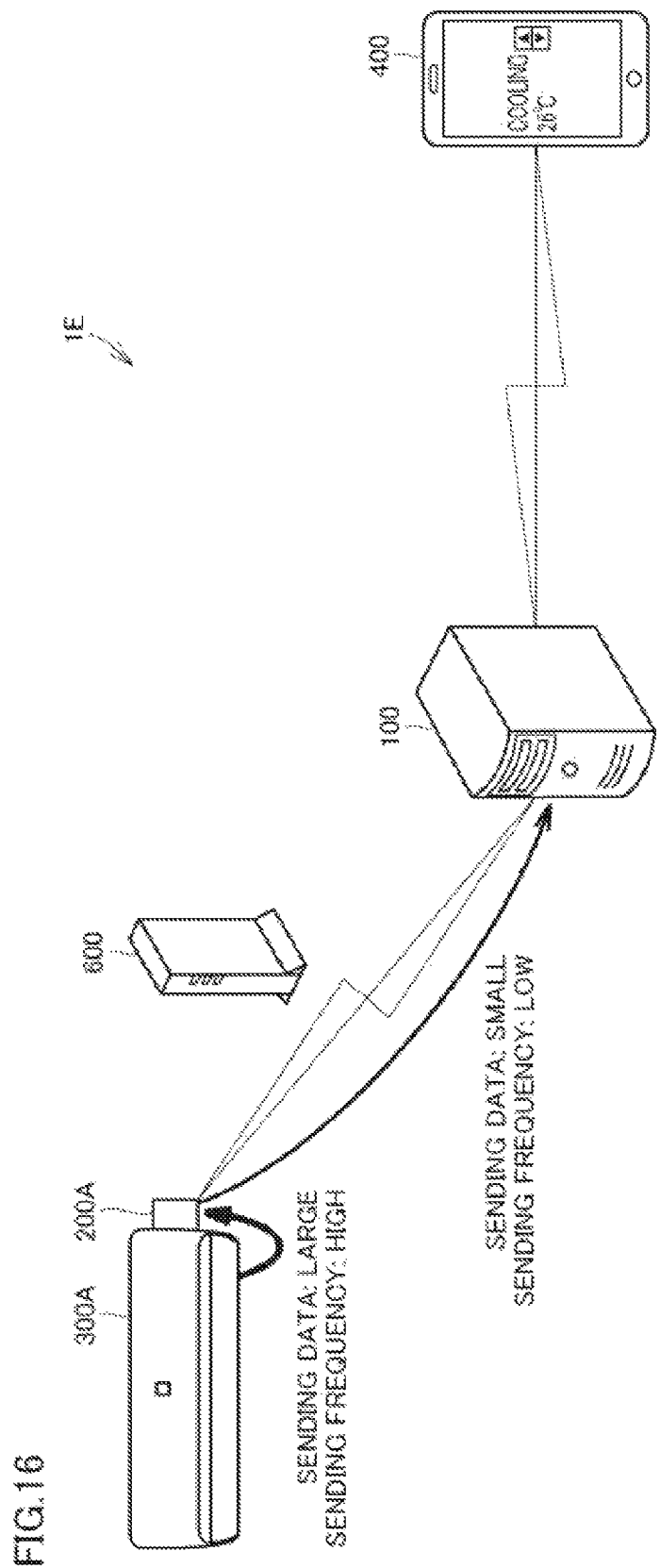
FIG. 16 is a schematic diagram representing the overall configuration of the network system 1E according to Fifth Embodiment.

The overall configuration of the network system 1E according to the present embodiment is described below. FIG. 16 is a schematic diagram representing the overall configuration of the network system 1E according to the present embodiment.

Referring to FIG. 16, the network system 1E according to the present embodiment includes an air conditioner 300A disposed as a home appliance in locations such as homes and offices, a controller 200A provided as a first terminal that enables data communications with the air conditioner 300A, a server 100 that enables data communications with the controller 200A, and a smartphone 400 provided as a second terminal that enables data communications with the server 100.

The following present embodiment will be described through the case where the home appliance is the air conditioner 300A. However, the home appliance may be, for example, a refrigerator as in Sixth Embodiment, or some other device such as a vacuum cleaner, a television, a washing machine, a rice cooker, an air purifier, a floor heating system, and an IH (Induction Heating) cooking heater. The air conditioner 300A can send and receive data to and from the controller 200A via a wired or a wireless connection.

The present embodiment will be described through the case where the first terminal is the controller 200A. The controller 200A can send and receive data to and from the air conditioner 300A via a wired or a wireless connection. The controller 200A also can send and receive data to and from the server 100 via a wired or a wireless connection.

The present embodiment will be described through the case where the second terminal is the smartphone 400. The smartphone 400 can send and receive data to and from the server 100 via a wireless connection.

The server 100 can send and receive data to and from the controller 200A and the smartphone 400 over a network such as the Internet, and LAN.

<Brief Overview of Network System Operation>

Figure 17:
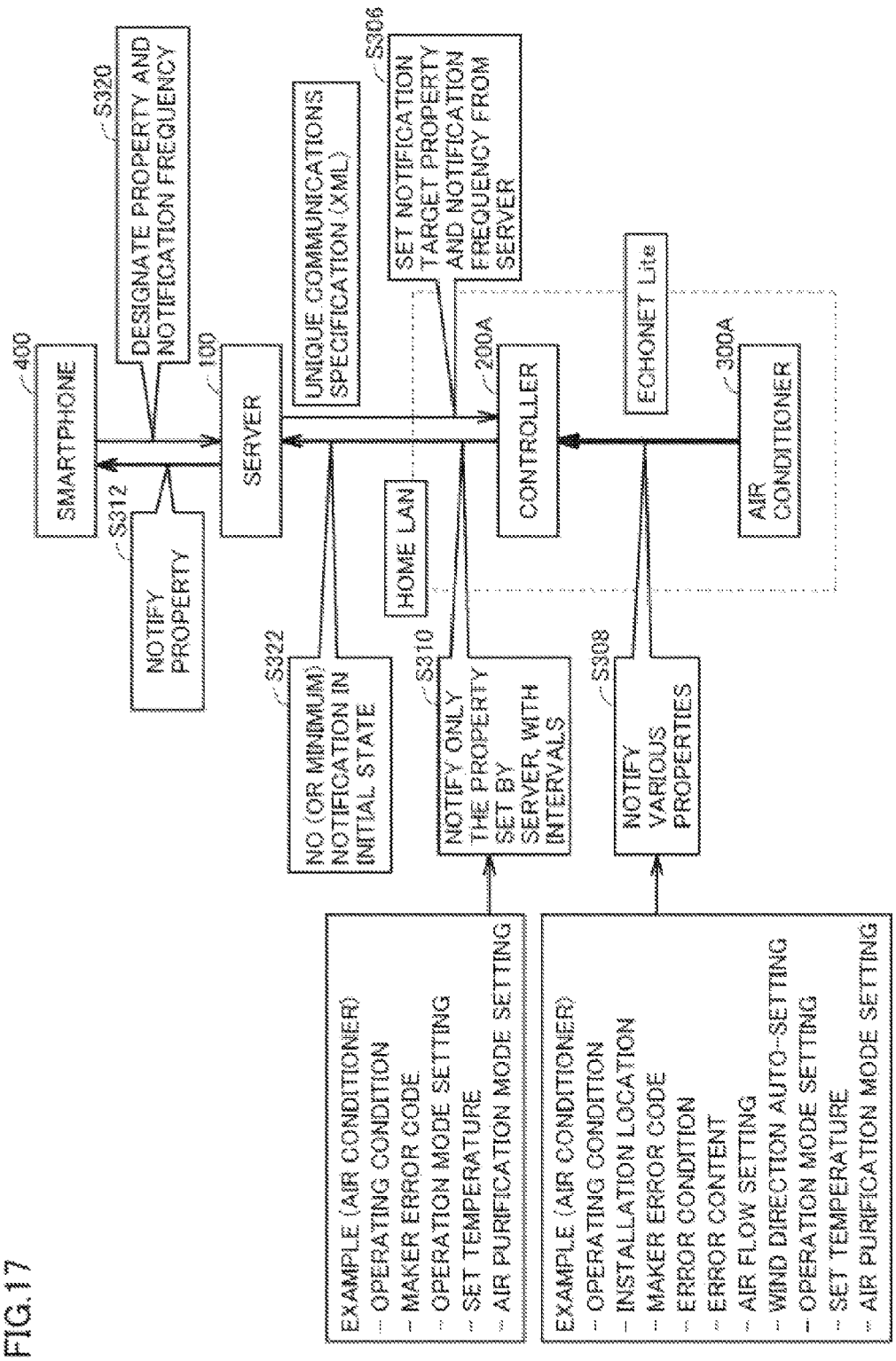
FIG. 17 is a schematic diagram briefly representing the overall operation of the network system 1E according to Fifth Embodiment.

The following is a brief overview of the operation of the network system 1E according to the present embodiment. FIG. 17 is a schematic diagram briefly representing the operation of the network system 1E according to the present embodiment.

Referring to FIG. 17, the server 100 sends the controller 200A data for designating the notification property to be sent from the controller 200A concerning the air conditioner 300A, and data for designating the send timing of the notification property (step S306). For example, the server 100 sends the controller 200A a designation of a notification property for displaying on a remote control screen of the smartphone 400, and a designation of a timing for obtaining the notification property. The server 100 may send a designation of a notification property and a designation of a send timing to the controller 200A, by using an instruction from an air conditioner control application from the smartphone 400 (step S320).

The controller 200A accepts the designation of a notification property and the designation of a send timing from the server 100. Other main roles of the controller 200A include receiving control instructions from the smartphone 400 and the server 100, and sending the data to the air conditioner 300A.

The air conditioner 300A sends various notification properties to the controller 200A either on a regular basis or upon accepting a control instruction from devices such as a switch and a remote controller (step S308). In the present embodiment, the communications between the air conditioner 300A and the controller 200A are based on the ECHONET Lite communications protocol.

Upon receiving various notification properties from the air conditioner 300A (step S308), the controller 200A sends only the designated property from among the currently stored notification properties at the timing designated by the server 100 (step S310).

In the network system 1E according to the present embodiment, the controller 200A does not send a notification property to the server 100 in the initial state, specifically when the controller 200A or the air conditioner 300A has just been newly installed, and the server 100 has not designated any notification property. Alternatively, in the initial state, the controller 200A sends the server 100 only information such as power ON/OFF information (step S322).

The server 100 receives only the designated notification property from the controller 200A at the designated timing. By using the received notification property, the server 100 sends the latest status information concerning the air conditioner 300A to the smartphone 400 associated with the sending controller 200A or air conditioner 300A (step S312).

Specifically, in the present embodiment, for example, the server 100 receives a plurality of notification properties from a plurality of air conditioners 300A and controllers 200A disposed in different homes, as shown in FIG. 3. To be more specific, the server 100 receives large numbers of notification properties from air conditioners 300A disposed in different homes, offices, buildings, companies, and regions.

In network systems of related art, there is a high possibility of creating heavy traffic from the air conditioner 300A to the server 100, or overloading the server 100. In the present embodiment, however, the type of notification property itself, and the frequency of sending the notification property are reduced, or more than one notification property is sent to the server 100 at once. This makes it possible to reduce the possibility of creating heavy traffic from the air conditioner 300A to the server 100, or the possibility of overloading the server 100.

The following describes the specific configuration of the network system 1E for realizing such functions.

<Hardware Configuration of Server 100>

The hardware configuration of the server 100 is substantially the same as that described in First Embodiment (see FIG. 4), and the following describes only a specific example of the operation of the processor 110.

For example, the processor 110 accepts a designation of a notification property of the air conditioner 300A, and a designation of a send interval of the notification property from an administrator via the input/output unit 130, or from the smartphone 400 via the communication interface 160. For example, the processor 110 sends the controller 200A information indicative the notification property to be sent, and information indicative of a notification property send interval via the communication interface 160. The processor 110 receives the notification property from the controller 200A via the communication interface 160. By using the notification property from the controller 200A, the processor 110 creates data to be sent to the smartphone 400, and sends the data to the smartphone 400 via the communication interface 160.

<Hardware Configuration of Controller 200A>

The hardware configuration of the controller 200A is substantially the same as that described in First Embodiment (see FIG. 5), and the following describes only a specific example of the operation of the processor 210.

<Communication Process by Controller 200A>

Figure 18:
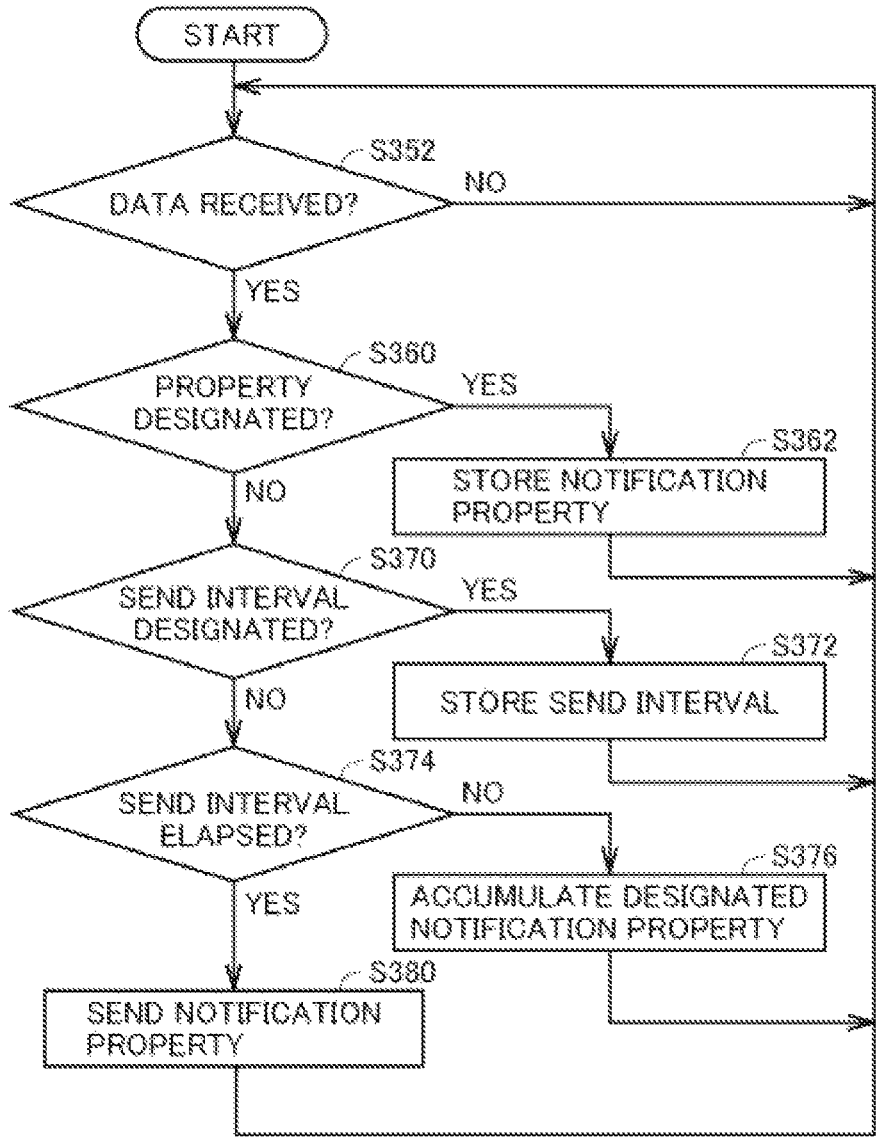
FIG. 18 is a flowchart representing the communication process by the controller 200A according to Fifth Embodiment.

The following describes the communication process by the controller 200A according to the present embodiment. FIG. 18 is a flowchart representing the communication process by the controller 200A according to the present embodiment.

Referring to FIG. 18, the processor 210 determines whether data has been received from other devices via the communication interface 260 (step S352). When in receipt of data (YES in step S352), the processor 210 determines whether the data is from the server 100 sent to designate the notification property to be sent (step S360).

When the data is from the server 100 sent to designate the notification property to be sent (YES in step S360), the processor 210 stores the designated notification property in the memory 220 (step S362). The processor 210 repeats the procedures from step 352.

When the data is not from the server 100 sent to designate the notification property to be sent (NO in step S360), the processor 210 determines whether the data is from the server 100 sent to designate a notification property send interval (step S370).

When the data is from the server 100 sent to designate a notification property send interval (YES in step S370), the processor 210 stores the designated send interval in the memory 220 (step S372). The processor 210 repeats the procedures from step S352.

When the data is not from the server 100 sent to designate a notification property send interval (NO in step S370), the processor 210 refers to the time value (not shown), and determines whether the designated send interval has elapsed from the last time a notification property was sent to the server 100 (step S374). If it is determined that the designated send interval has not elapsed since the last sending of a notification property to the server 100 (NO in step S374), the processor 210 stores the notification property from the air conditioner 300A in the memory 220 (step S376). Specifically, the processor 210 accumulates in the memory 220 the notification properties sent from the air conditioner 300A and designated by the server 100 until the designated send interval has elapsed since the last sending of a notification property to the server 100 (step S376). The processor 210 repeats the procedures from step S352.

If it is determined that the designated send interval has elapsed since the last sending of the notification property to the server 100 (YES in step S374), the processor 210 sends the accumulated notification properties to the server 100 (step S380). The processor 210 repeats the procedures from step S352.

<Hardware Configuration of Air Conditioner 300A>

The hardware configuration of the air conditioner 300A is substantially the same as that described in First Embodiment (see FIG. 7), and will not be described.

<Hardware Configuration of Smartphone 400>

The hardware configuration of the smartphone 400 is substantially the same as that described in First Embodiment (see FIG. 8), and will not be described.

As described above, in the network system 1E according to the present embodiment, the controller 200A sends the designated notification property to the server 100 at the send interval designated by the server 100. This makes it possible to reduce the possibility of creating heavy traffic from the controller 200A to the server 100, or the possibility of overloading the server 100.

Sixth Embodiment

The following describes Sixth Embodiment. Fifth Embodiment described the case where the home appliance is the air conditioner 300A. The present embodiment describes an example in which the home appliance is a refrigerator 300B.

<Overall Configuration of Network System>

Figure 19:
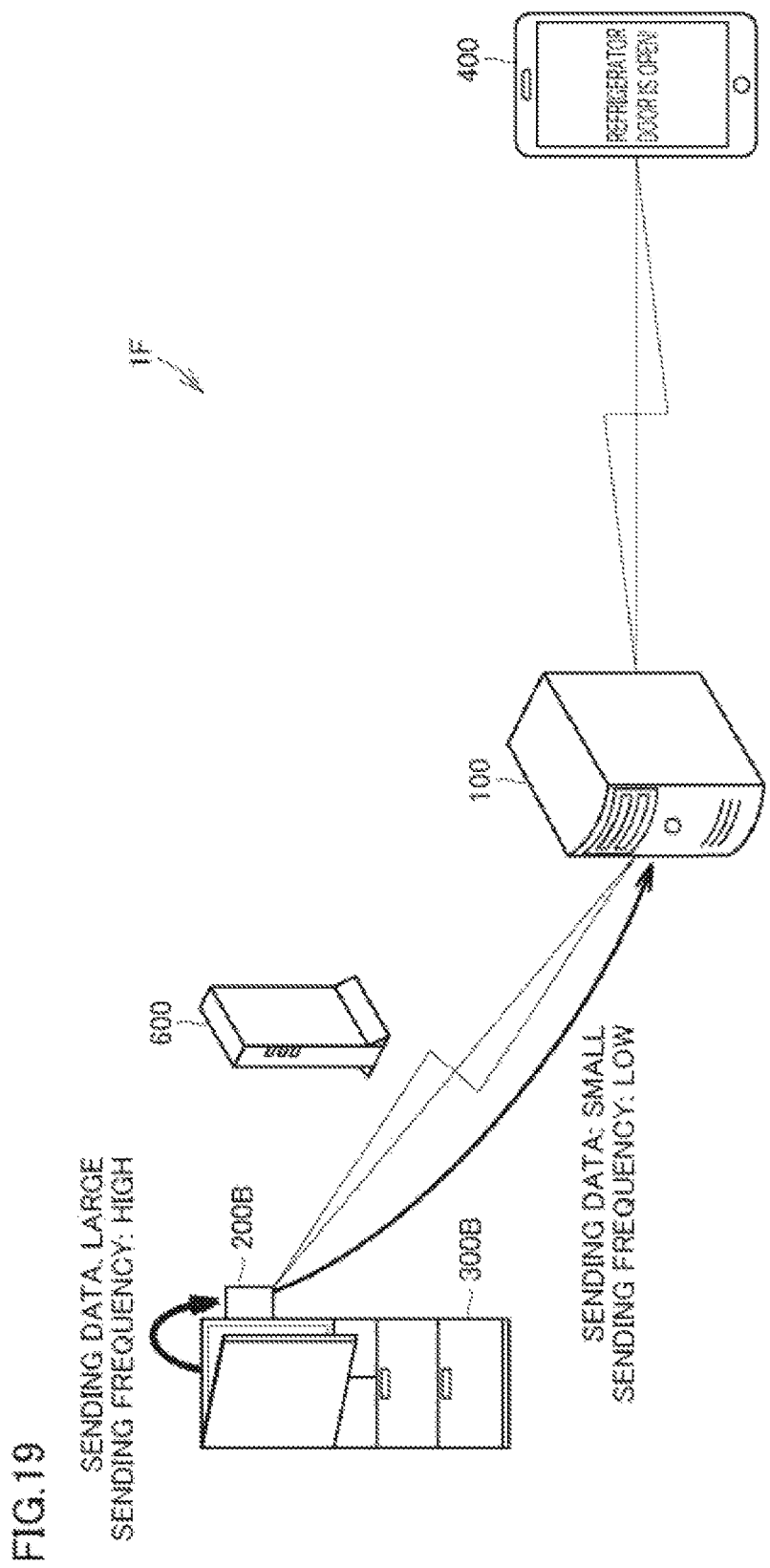
FIG. 19 is a schematic diagram representing the overall configuration of the network system 1F according to Sixth Embodiment.

The overall configuration of the network system 1F according to the present embodiment is described below. FIG. 19 is a schematic diagram representing the overall configuration of the network system 1F according to the present embodiment.

Referring to FIG. 19, the network system 1F according to the present embodiment includes a refrigerator 300B disposed as a home appliance in locations such as homes and offices, a controller 200B provided as a first terminal that enables data communications with the refrigerator 300B, a server 100 that enables data communications with the controller 200B, and a smartphone 400 provided as a second terminal that enables data communications with the server 100.

<Brief Overview of Network System Operation>

Figure 20:
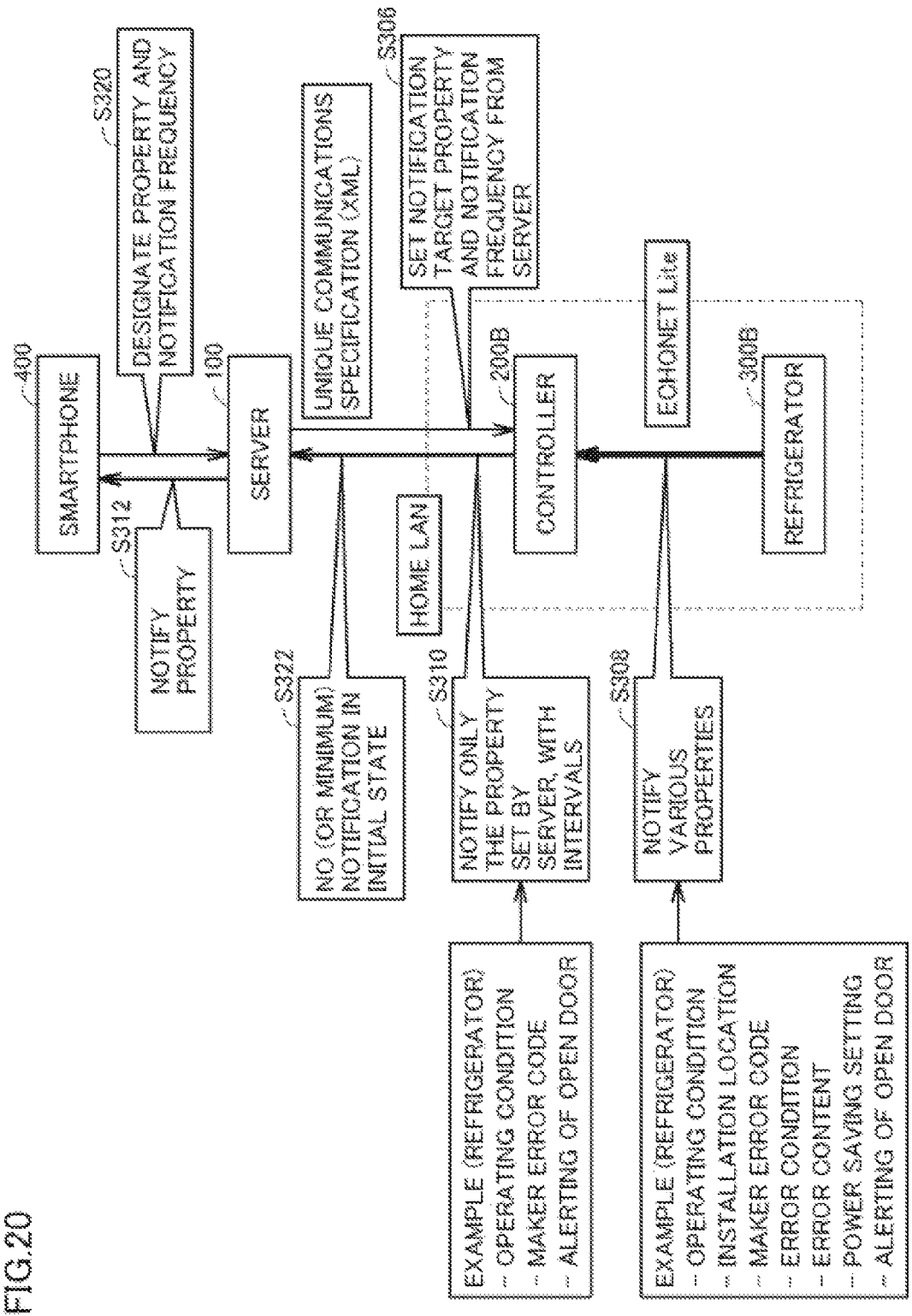
FIG. 20 is a schematic diagram briefly representing the overall operation of the network system 1F according to Sixth Embodiment.

The following is a brief overview of the operation of the network system 1F according to the present embodiment. FIG. 20 is a schematic diagram briefly representing the operation of the network system 1F according to the present embodiment.

Referring to FIG. 20, the server 100 sends the controller 200B data for designating the notification property to be sent from the controller 200B concerning the refrigerator 300B, and data for designating the send timing of the notification property (step S306). For example, the server 100 sends the controller 200B a designation of a notification property for displaying on a remote control screen of the smartphone 400, and a designation of a timing for obtaining the notification property. The server 100 may send a designation of a notification property and a designation of a send timing to the controller 200B, by using an instruction from a refrigerator control application from the smartphone 400 (step S320).

The controller 200B accepts the designation of a notification property and the designation of a send timing from the server 100. Other main roles of the controller 200B include receiving control instructions from the smartphone 400 and the server 100, and sending the data to the refrigerator 300B.

The refrigerator 300B sends various notification properties to the controller 200B either on a regular basis or upon accepting a control instruction from devices such as a switch and a remote controller (step S308). In the present embodiment, the communications between the refrigerator 300B and the controller 200B are based on the ECHONET Lite communications protocol.

Upon receiving various notification properties from the refrigerator 300B (step S308), the controller 200B sends only the designated property from among the currently stored notification properties at the timing designated by the server 100 (step S310).

In the network system 1F according to the present embodiment, the controller 200B does not send a notification property to the server 100 in the initial state, specifically when the controller 200B or the refrigerator 300B has just been newly installed, and the server 100 has not designated any notification property. Alternatively, in the initial state, the controller 200B sends the server 100 only information such as power ON/OFF information (step S322).

The server 100 receives only the designated notification property from the controller 200B at the designated timing. By using the received notification property, the server 100 sends the latest status information concerning the refrigerator 300B to the smartphone 400 associated with the sending controller 200B or refrigerator 300B (step S312).

Specifically, in the present embodiment, for example, the server 100 receives a plurality of notification properties from a plurality of refrigerators and controllers disposed in different homes, as shown in FIG. 3. To be more specific, the server 100 receives large numbers of notification properties from refrigerators disposed in different homes, offices, buildings, companies, and regions.

In network systems of related art, there is a high possibility of creating heavy traffic from the refrigerator 300B to the server 100, or overloading the server 100. In the present embodiment, however, the type of notification property itself, and the frequency of sending the notification property are reduced, or more than one notification property is sent to the server 100 at once. This makes it possible to reduce the possibility of creating heavy traffic from the refrigerator 300B to the server 100, or the possibility of overloading the server 100.

The specific configuration of the network system 1F is the same as that described in Fifth Embodiment, and will not be described.

Seventh Embodiment

The following describes Seventh Embodiment. In First, Third, and Fifth Embodiments, the server 100 provides services concerning the air conditioner 300A. In Second, Fourth, and Sixth Embodiments, the server 100 provides services concerning the refrigerator 300B. However, the server 100 may provide services concerning more than one type of home appliance, as in the present embodiment.

Figure 21:
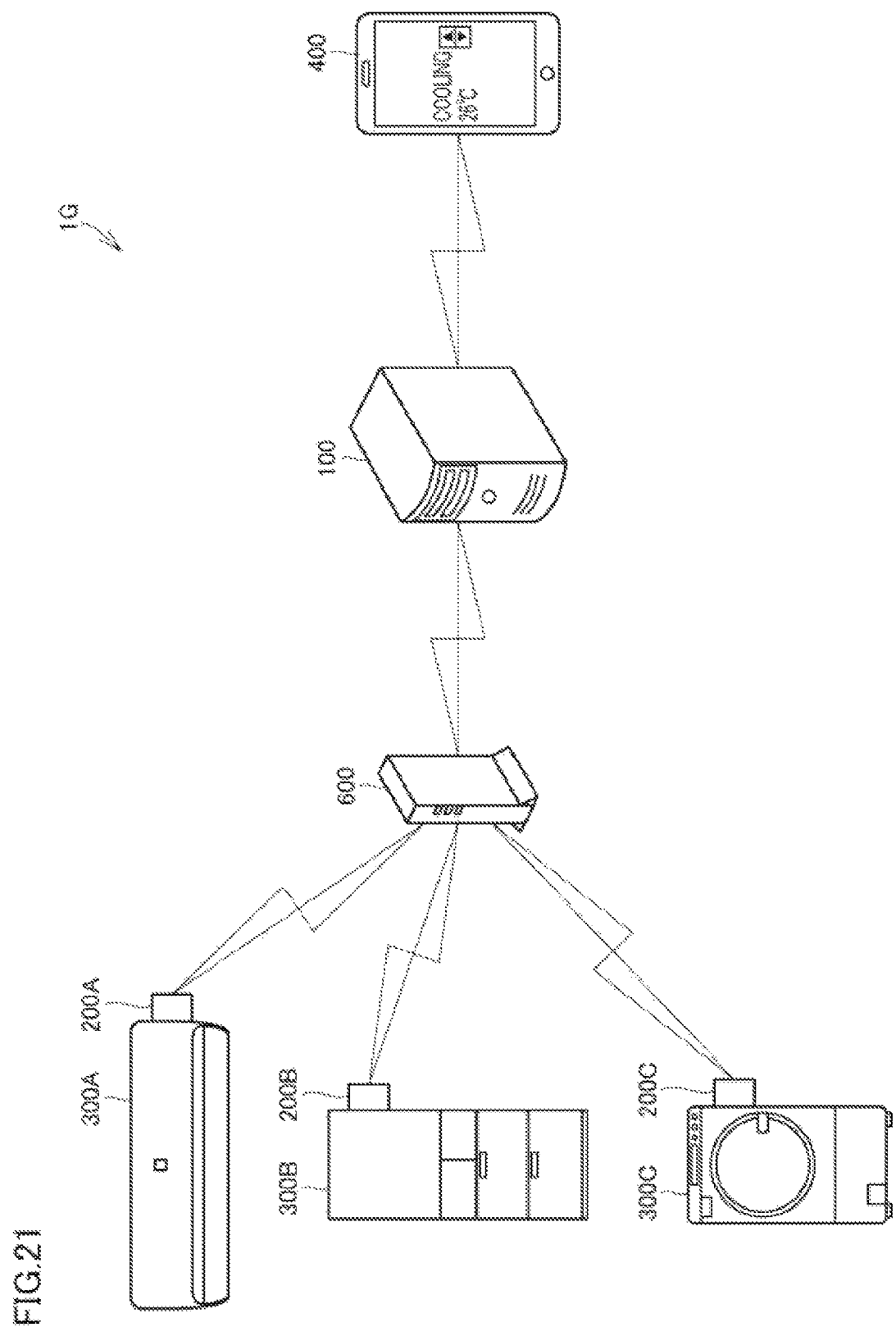
FIG. 21 is a schematic diagram representing the overall configuration of the network system 1G according to Seventh Embodiment.
Figure 22:
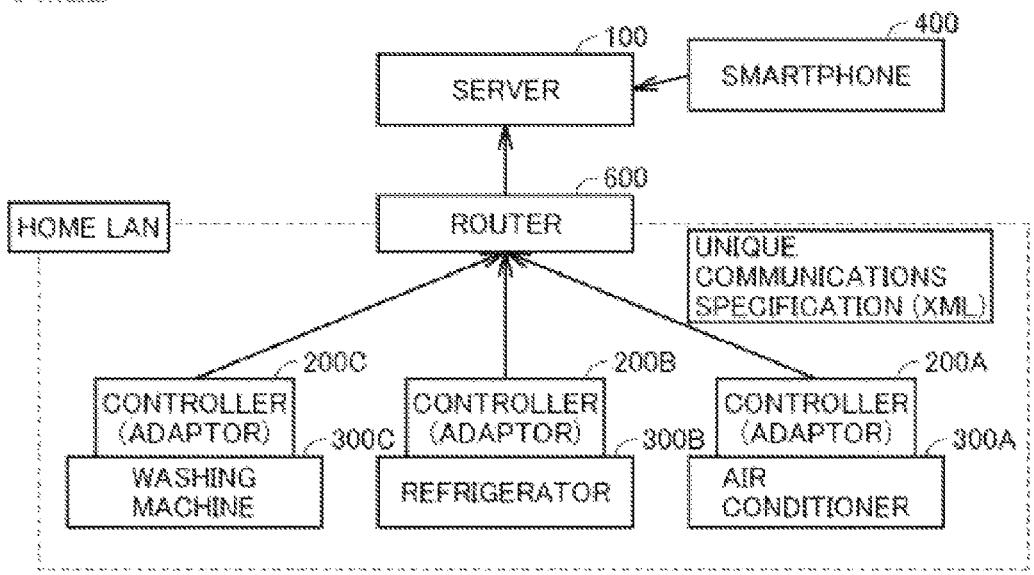
FIG. 22 is a functional block diagram representing the overall configuration of the network system 1G according to Seventh Embodiment.

FIG. 21 is a schematic diagram representing the overall configuration of the network system 1G according to the present embodiment. FIG. 22 is a functional block diagram representing the overall configuration of the network system 1G according to the present embodiment.

Referring to FIGS. 21 and 22, the network system 1G according to the present embodiment includes an air conditioner 300A, a refrigerator 300B, and a washing machine 300C disposed as home appliances in locations such as homes and offices, controllers 200A, 200B, and 200C provided as first terminals that enable data communications with the home appliances, a server 100 that enables data communications with the controllers 200A, 200B, and 200C, and a smartphone 400 provided as a second terminal that enables data communications with the server 100.

The overall operation and the specific configuration of the network system 1G will not be described because these are a combination of the overall operations of First, Third, and Fifth Embodiments, the overall operations of Second, Fourth, and Sixth Embodiments, and the overall operation of the washing machine 300C. Specifically, the server 100 in the network system 1G according to the present embodiment serves as the servers 100 of First, Third, and Fifth Embodiments, the servers 100 of Second, Fourth, and Sixth Embodiments, and the server 100 associated with the washing machine 300C.

In the present embodiment, the controllers 200A, 200B, and 200C provided for the home appliances 300A, 300B, and 300C, respectively. For example, the home appliances 300A, 300B, and 300C and the controllers 200A, 200B, and 200C perform communications in accordance with the ECHONET Lite specifications. The controllers 200A, 200B, and 200C are connected to the server 100 via a router 600. For example, the controllers 200A, 200B, and 200C and the server 100 communicate in XML format for each service.

More specifically, the server 100 according to the present embodiment stores a designation of a notification property for each home appliance. Alternatively, the server 100 stores a designation of a notification property send interval for each home appliance. Alternatively, the server 100 stores a designation of a notification property and a designation of a send interval for each home appliance.

Eighth Embodiment

The following describes Eighth Embodiment. In the network system 1G according to Seventh Embodiment, the controllers 200A, 200B, and 200C are provided for the home appliances 300A, 300B, and 300C, respectively.

Figure 23:
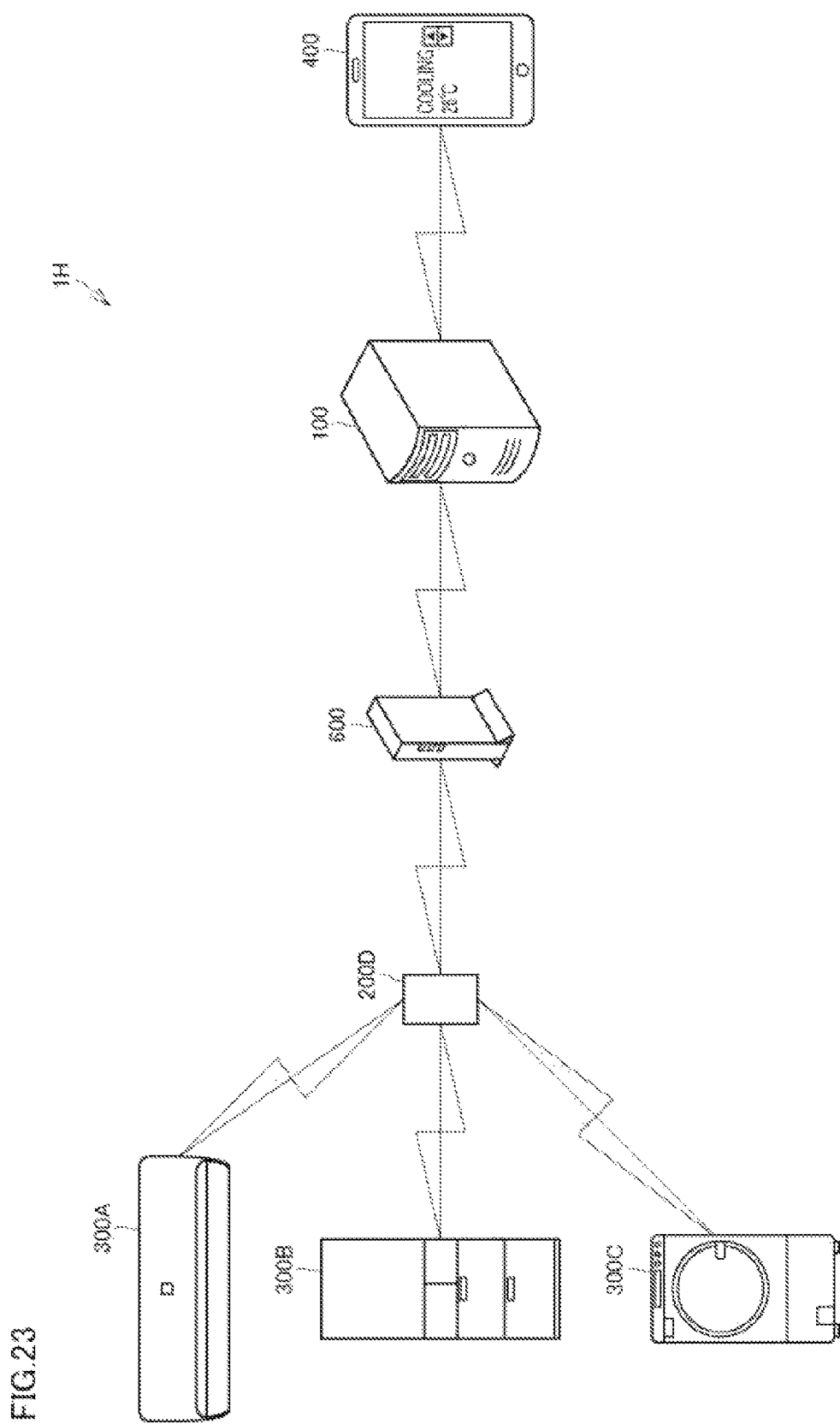
FIG. 23 is a schematic diagram representing the overall configuration of the network system 1H according to Eighth Embodiment.
Figure 24:
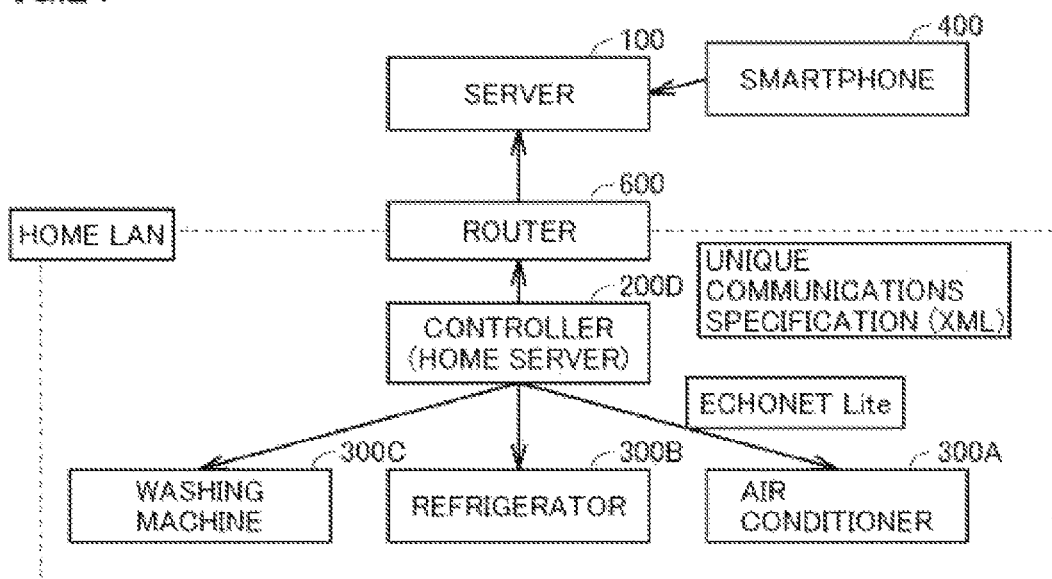
FIG. 24 is a functional block diagram representing the overall configuration of the network system 1H according to Eighth Embodiment.

However, as shown in FIGS. 23 and 24, a single controller 200D may be provided for the home appliances 300A, 300B, and 300C. For example, the home appliances 300A, 300B, and 300C and the controller 200D communicate in accordance with the ECHONET Lite specifications. The controller 200D and the server 100 communicate with each other in XML format for each service, for example.

The controller 200D according to the present embodiment serves as the controllers 200A of First, Third, and Fifth Embodiments, the controllers 200B of Second, Fourth, and Sixth Embodiments, and the controller 200C associated with the washing machine 300C. Likewise, the server 100 in the network system 1H according to the present embodiment serves as the servers 100 of First, Third, and Fifth Embodiments, the servers 100 of Second, Fourth, and Sixth Embodiments, and the server 100 associated with the washing machine 300C.

Specifically, the server 100 according to the present embodiment stores a designation of a notification property for each home appliance. Alternatively, the server 100 stores a designation of a notification property send interval for each home appliance. Alternatively, the server 100 stores a designation of a notification property and a designation of a send interval for each home appliance.

With the designation of a notification property by the server 100, the processor 210 of the controller 200D stores the notification property designated by the server 100. This data is stored in the memory 220 for each home appliance. Here, the processor 210 extracts the notification property of the corresponding home appliance upon receiving notification property data from the home appliance. The processor 210 sends the extracted notification property to the server 100.

Alternatively, with the designation of a notification property send interval by the server 100, the processor 210 of the controller 200D stores the notification property send interval designated by the server 100. This data is stored in the memory 220 for each home appliance. Here, the processor 210 sends the notification property to the server 100 upon receiving notification property data from the home appliance, after the send interval corresponding to the home appliance has elapsed since the last sending of a notification property.

Alternatively, with the designation of a notification property and the designation of a send interval by the server 100, the processor 210 of the controller 200D stores the notification property and the send interval designated by the server 100. This data is stored in the memory 220 for each home appliance. Here, the processor 210 extracts and accumulates the notification property of the corresponding home appliance upon receiving notification property data from the home appliance. The processor 210 then sends the notification property to the server 100 after the send interval corresponding to the home appliance has elapsed since the last sending of a notification property.

Ninth Embodiment

The following describes Ninth Embodiment. In the network systems according to Third to Sixth Embodiments, the controllers 200A and 200B send all the accumulated notification properties to the server 100.

Figure 25:
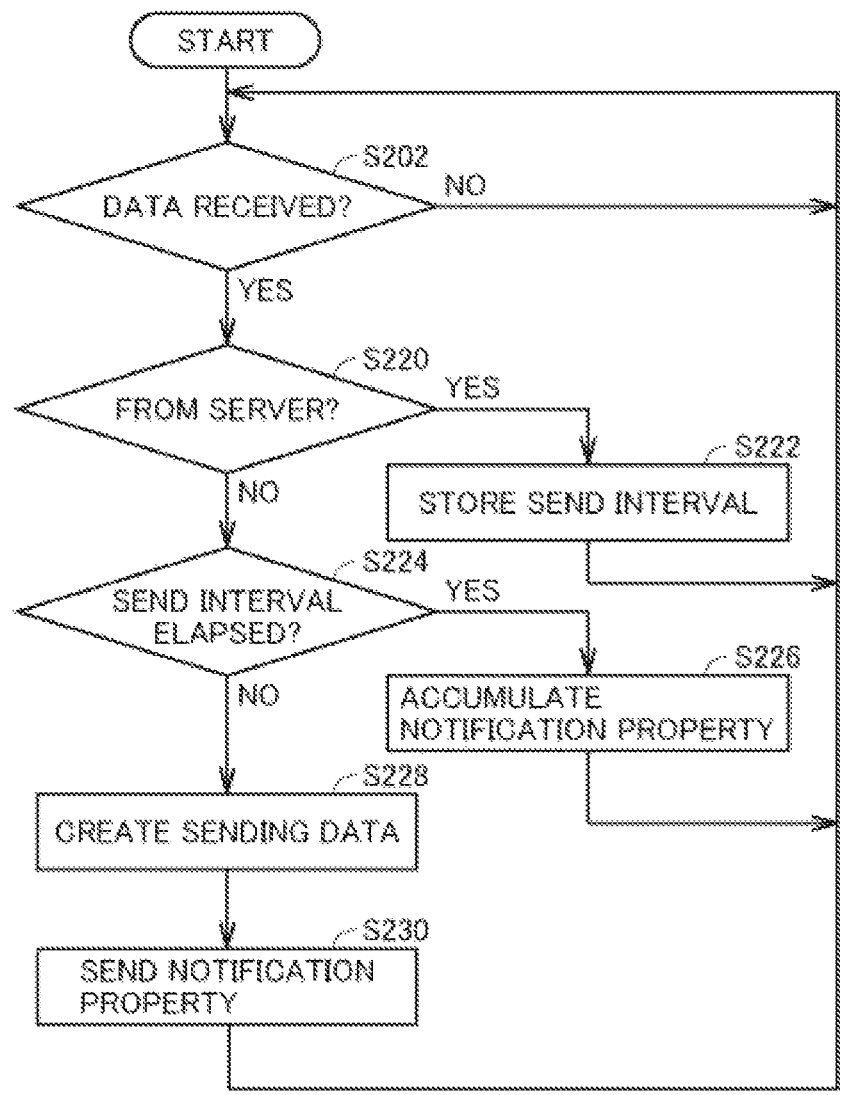
FIG. 25 is a flowchart representing the communication process by the controller 200A according to Ninth Embodiment.

In the present embodiment, the processor 210 creates sending data by using the most recent notification property in the accumulated notification properties, as in step S228 of FIG. 25. The processor 210 sends the sending data to the server 100 (step S230). Other configurations and processes are the same as in Third and Fourth Embodiments, and will not be described.

Tenth Embodiment

The following describes Tenth Embodiment. In the network systems according to Third to Sixth Embodiments, the controllers 200A and 200B send all the accumulated notification properties to the server 100.

Figure 26:
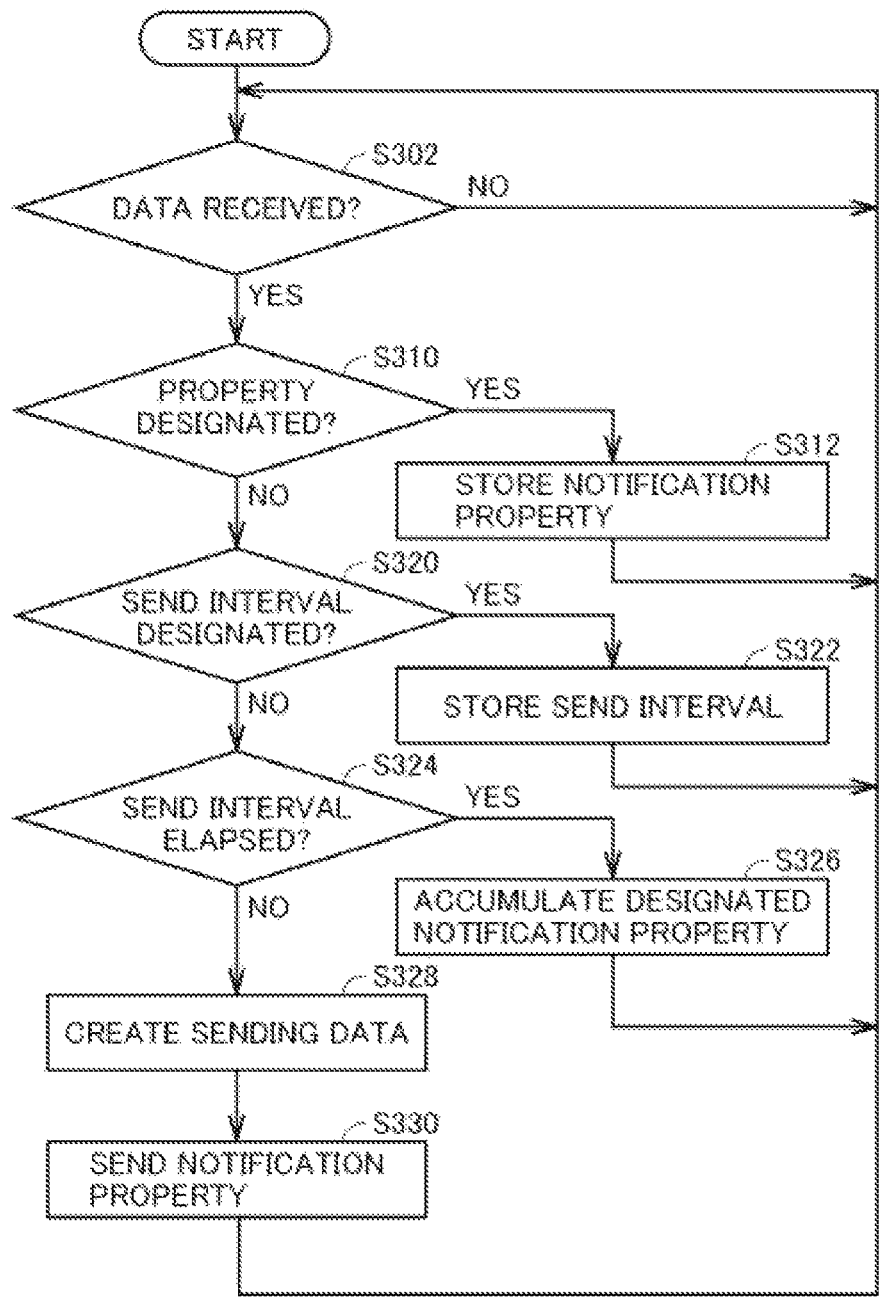
FIG. 26 is a flowchart representing the communication process by the controller 200A according to Tenth Embodiment.

In the present embodiment, the processor 210 creates sending data by using the most recent notification property in the designated notification properties from all the accumulated notification properties, as in step S328 of FIG. 26. The processor 210 sends the sending data to the server 100 (step S330). Other configurations and processes are the same as in Fifth and Sixth Embodiments, and will not be described.

Eleventh Embodiment

The following describes Eleventh Embodiment. In the network systems according to Third to Sixth Embodiments, the controllers 200A and 200B send all the accumulated notification properties to the server 100.

In the present embodiment, the processor 210 creates sending data by combining the most recent notification properties from the plurality of notification properties contained in the accumulated notification properties, as in step S228 of FIG. 25. Specifically, the processor 210 creates and updates sending data by updating only the notification properties that had a change (notification property difference) in the plurality of accumulated notification properties. The processor 210 then sends the most recent combination based on the notification property difference to the server 100 (step S230). Other configurations and processes are the same as in Third and Fourth Embodiments, and will not be described.

Twelfth Embodiment

The following describes twelfth Embodiment. In the network systems according to Third to Sixth Embodiments, the controllers 200A and 200B send all the accumulated notification properties to the server 100.

In the present embodiment, the processor 210 creates sending data by combining the most recent notification properties from the plurality of designated notification properties contained in the accumulated notification properties, as in step S328 of FIG. 26. Specifically, the processor 210 creates and updates sending data by updating only the notification properties that had a change (notification property difference) in the plurality of accumulated notification properties. The processor 210 then sends the most recent combination based on the notification property difference to the server 100 (step S330). Other configurations and processes are the same as in Third and Fourth Embodiments, and will not be described.

Thirteenth Embodiment

Thirteenth Embodiment is described below.

In the present embodiment, the processor 110 of the server 100 checks the load on the server 100 either on a regular basis or upon receiving a notification property from a home appliance. The processor 110 then sends the controllers 200A and 200B a designation instruction for sending a notification property when the load on the server 100 is at or above a predetermined value.

Alternatively, the processor 110 of the server 100 checks the load on the server 100 either on a regular basis or upon receiving a notification property from a home appliance. The processor 110 then sends the controllers 200A and 200B a designation instruction concerning a send timing such as a notification property send interval when the load on the server 100 is at or above a predetermined value. The memory 120 of the server 100 may store a plurality of predetermined values, and the processor 110 may increase the send interval in a stepwise fashion as the load increases.

Alternatively, the processor 110 of the server 100 checks the load on the server 100 either on a regular basis or upon receiving a notification property from a home appliance. The processor 110 then sends the controllers 200A and 200B a designation instruction for sending a notification property, and a designation instruction concerning a send timing such as a notification property send interval when the load on the server 100 is at or above a predetermined value. The memory 120 of the server 100 may store a plurality of predetermined values, and the processor 110 may increase the send interval in a stepwise fashion as the load increases.

The processor 110 of the server 100 may designate the type of notification property to be sent, or the send interval of a notification property only for services, notification properties, or home appliances that are under a high load.

Fourteenth Embodiment

Fourteenth Embodiment is described below.

In the present embodiment, the processor 110 of the server 100 checks the reception frequency or the transmission frequency of a notification property within a predetermined time period, either on a regular basis or upon receiving a notification property from a home appliance. The processor then sends the controllers 200A and 200B a designation instruction for sending a notification property when the reception frequency or the transmission frequency of a notification property in the server 100 is at or above a predetermined value.

Alternatively, the processor 110 of the server 100 checks the reception frequency or the transmission frequency of a notification property within a predetermined time period, either on a regular basis or upon receiving a notification property from a home appliance. The processor then sends the controllers 200A and 200B a designation instruction concerning a send timing such as the send interval of a notification property when the reception frequency or the transmission frequency of a notification property in the server 100 is at or above a predetermined value. The memory 120 of the server 100 may store a plurality of predetermined values, and the processor 110 may increase the send interval in a stepwise fashion as the reception or transmission frequency increases.

Alternatively, the processor 110 of the server 100 checks the reception frequency or the transmission frequency of a notification property within a predetermined time period, either on a regular basis or upon receiving a notification property from a home appliance. The processor then sends the controllers 200A and 200B a designation instruction for sending a notification property, and a designation instruction concerning a send timing such as the send interval of a notification property when the reception frequency or the transmission frequency of a notification property in the server 100 is at or above a predetermined value. The memory 120 of the server 100 may store a plurality of predetermined values, and the processor 110 may increase the send interval in a stepwise fashion as the reception or transmission frequency increases.

The processor 110 of the server 100 may designate the type of notification property to be sent, or the send interval of a notification property only for services, notification properties, or home appliances for which the notification property reception or transmission frequency is high.

Fifteenth Embodiment

Fifteenth Embodiment is described below.

In the present embodiment, the processor 110 of the server 100 does not send a notification property designation and send instruction to the controllers 200A and 200B of paying members of a remote control service of a home appliance. Specifically, the embodiment may be implemented so that the server 100 does not send an instruction for inhibiting the sending of notification properties, when the controllers 200A and 200B are in a default setting that allows all the notification properties to be sent. Alternatively, the embodiment may be implemented so that the server 100 sends an instruction for sending all the notification properties, when the controllers 200A and 200B are in a default setting that does not allow sending of notification properties. Conversely, the processor 110 of the server 100 sends a notification property designation and send instruction to the controllers 200A and 200B of non-paying members of a remote control service of a home appliance. Specifically, the embodiment may be implemented so that the server 100 sends an instruction for inhibiting the sending of notification properties, when the controllers 200A and 200B are in a default setting that allows all the notification properties to be sent. Alternatively, the embodiment may be implemented so that the server 100 sends an instruction for sending a designated notification property, when the controllers 200A and 200B are in a default setting that does not allow sending of notification properties.

Alternatively, the processor 110 of the server 100 does not send a designation instruction concerning a send timing such as the send interval of a notification property to the controllers 200A and 200B of paying members of a remote control service of a home appliance. Specifically, the embodiment may be implemented so that the server 100 does not send an instruction for inhibiting the sending of notification properties when the controllers 200A and 200B are in a default setting that allows for sending of notification properties. Alternatively, the embodiment may be implemented so that the server 100 sends an instruction for sending a notification property at an arbitrary timing when the controllers 200A and 200B are in a default setting that does not allow sending of notification properties. Conversely, the processor 110 of the server 100 sends a designation instruction concerning a send timing such as the send interval of a notification property to the controllers 200A and 200B of non-paying members of a remote control service of a home appliance. Specifically, the embodiment may be implemented so that the server 100 sends an instruction for inhibiting the sending of notification properties when the controllers 200A and 200B are in a default setting that allows all the notification properties to be sent. Alternatively, the embodiment may be implemented so that the server 100 sends an instruction for sending a notification property at the designated time interval when the controllers 200A and 200B are in a default setting that does not allow sending of notification properties.

Alternatively, the processor 110 of the server 100 does not send a designation instruction for sending a notification property, or a designation instruction concerning a send timing such as the send interval of a notification property to the controllers 200A and 200B of paying members of a remote control service of a home appliance. Specifically, the embodiment may be implemented so that the server 100 does not send an instruction for inhibiting the sending of notification properties when the controllers 200A and 200B are in a default setting that allows for sending of notification properties, or that the server 100 sends an instruction for sending all the notification properties at an arbitrary timing when the controllers 200A and 200B are in a default setting that does not allow for sending of notification properties. Conversely, the processor 110 of the server 100 sends a designation instruction for sending a notification property, and a designation instruction concerning a send timing such as the send interval of a notification property to the controllers 200A and 200B of non-paying members of a remote control service of a home appliance. Specifically, the embodiment may be implemented so that the server 100 sends an instruction for inhibiting the sending of notification properties when the controllers 200A and 200B are in a default setting that allows all the notification properties to be sent. Alternatively, the embodiment may be implemented so that the server 100 sends an instruction for sending a designated notification property at the designated time interval when the controllers 200A and 200B are in a default setting that does not allow sending of notification properties.

Examples of Other Applications

As is evident, the present invention also can be achieved by supplying a program to a system or a device. The advantages of the present invention also can be obtained with a computer (or a CPU or an MPU) in a system or a device upon the computer reading and executing the program code stored in the supplied storage medium (or memory) storing software programs intended to realize the present invention.

In this case, the program code itself read from the storage medium realizes the functions of the embodiments above, and the storage medium storing the program code constitutes the present invention.

Evidently, the functions of the embodiments above can be realized not only by a computer reading and executing such program code, but by some or all of the actual processes performed by the OS (operating system) or the like running on a computer under the instructions of the program code.

The functions of the embodiments above also can be realized by some or all of the actual processes performed by the CPU or the like of an expansion board or expansion unit under the instructions of the program code read from a storage medium and written into other storage medium provided in the expansion board inserted into a computer or the expansion unit connected to a computer.

The embodiments disclosed herein are to be considered in all aspects only as illustrative and not restrictive. The scope of the present invention is to be determined by the scope of the appended claims, not by the foregoing descriptions, and the invention is intended to cover all modifications falling within the equivalent meaning and scope of the scope of the claims set forth below.

What is claimed is:

1. A network system comprising at least one terminal and a server,
wherein the server sends said at least one terminal first information for designating a time interval for sending data to inhibit sending of data from said at least one terminal, and
wherein said at least one terminal each accumulates unsent data from the obtained data, creates data indicative of a difference in the plurality of accumulated data, and sends the data indicative of the difference to the server, according to the information from the server.

2. The network system according to claim 1, wherein said at least one terminal sends the server only the most recent data in unsent data from the obtained data according to the first information.

3. The network system according to claim 1, wherein the information sent from the server to said at least one terminal is second information for designating a type of data to be sent.

4. The network system according to claim 3, wherein the server accepts a designation of a required data type from other terminal, and sends the second information to said at least one terminal according to the designated data type.

5. The network system according to claim 1, wherein the server sends the information to said at least one terminal when a predetermined condition is satisfied, and does not send the information to said at least one terminal when the predetermined condition is not satisfied.

6. The network system according to claim 5, wherein the server sends the information to said at least one terminal under the predetermined condition that a server load exceeds a predetermined value, and does not send the information to said at least one terminal under the predetermined condition that the server load does not exceed the predetermined value.

7. The network system according to claim 5, wherein the server sends the information to said at least one terminal under the predetermined condition that the terminal is a terminal of a non-paying member, and does not send the information to said at least one terminal under the predetermined condition that the terminal is a terminal of a paying member.

8. A communication method for a network system that includes at least one terminal and a server,
the method comprising:
the server sending said at least one terminal first information for designating a time interval for sending data to inhibit sending of data from said at least one terminal; and
said at least one terminal each accumulating unsent data from obtained data, creating data indicative of a difference in the plurality of accumulated data, and sending the data indicative of the difference to the server, according to the information from the server.

9. A server comprising:
a communication interface for communicating with at least one terminal; and
a processor for sending said at least one terminal via the communication interface first information for designating a time interval for sending data to inhibit sending of data from said at least one terminal, and receiving from said at least one terminal via the communication interface data indicative of a difference in a plurality of accumulated data.

10. A communication method for a server that includes a processor and a communication interface,
the method comprising:
the processor sending said at least one terminal via the communication interface first information for designating a time interval for sending data to inhibit sending of data from said at least one terminal; and
the processor receiving from said at least one terminal via the communication interface data indicative of a difference in a plurality of accumulated data.

11. A terminal comprising:
a communication interface for communicating with a server; and
a processor for receiving from the server via the communication interface first information for designating a time interval for sending data to inhibit sending of data to the server, accumulating unsent data from the obtained data according to the information from the server, creating data indicative of a difference in the plurality of accumulated data, and sending the data indicative of the difference to the server via the communication interface.

12. A communication method for a terminal that includes a processor and a communication interface,
the method comprising:
the processor receiving from a server via the communication interface first information for designating a time interval for sending data to inhibit sending of data to the server;
the processor accumulating unsent data from the obtained data according to the information from the server;
the processor creating data indicative of a difference in the plurality of accumulated data; and
the processor sending the data indicative of the difference to the server via the communication interface.

* * * * *